US012783562B2

(12) United States Patent
Choi

(10) Patent No.: US 12,783,562 B2
(45) Date of Patent: Nov. 3, 2026

(54) METHOD AND SYSTEM FOR PROVIDING ARTIFICIAL INTELLIGENCE MODEL INCLUDING PLURALITY OF MODELS

(71) Applicant: LG MANAGEMENT DEVELOPMENT INSTITUTE CO., LTD., Seoul (KR)

(72) Inventor: Ye Muk Choi, Seoul (KR)

(73) Assignee: LG MANAGEMENT DEVELOPMENT INSTITUTE CO., LTD., Seoul (KR)

( * ) Notice: Subject to any disclaimer, the term of this patent is extended or adjusted under 35 U.S.C. 154(b) by 0 days.

(21) Appl. No.: 19/424,107

(22) Filed: Dec. 17, 2025

(65) Prior Publication Data

US 2026/0119545 A1 Apr. 30, 2026

Related U.S. Application Data

(63) Continuation of application No. PCT/KR2025/006676, filed on May 16, 2025.

(30) Foreign Application Priority Data

May 17, 2024 (KR) ........................ 10-2024-0064550

(51) Int. Cl.
*G10L 15/22* (2006.01)
*G06F 9/50* (2006.01)
(Continued)

(52) U.S. Cl.
CPC ...... *G06F 16/33295* (2025.01); *G06F 9/5005* (2013.01); *G06N 20/00* (2019.01);
(Continued)

(58) Field of Classification Search
None
See application file for complete search history.

(56) References Cited

U.S. PATENT DOCUMENTS 10,867,595 B2 * 12/2020 Sriram .................. G10L 15/063
11,631,017 B2 * 4/2023 White .................... G06N 5/043
706/49

(Continued)

FOREIGN PATENT DOCUMENTS

KR 10-2022-0078830 6/2022
KR 20220078830 A * 6/2022 ............ G06N 20/00
KR 10-2022-0106215 7/2022

OTHER PUBLICATIONS

IP.com translation of KR-20220078830-A. (Year: 2022).*

(Continued)

*Primary Examiner* — Richard Z Zhu
(74) *Attorney, Agent, or Firm* — PnK IP LLC

(57) ABSTRACT

A computerized method and system for providing and implementing an artificial intelligence (AI) model that includes a plurality of models are provided. The method employs, for example, a computer having at least one processor and at least one memory and comprises receiving a query, identifying a user's context based on the query, and receiving the identified context through at least one artificial intelligence model and generating a response to the query, wherein the generating of a response may comprise controlling at least one router to determine at least one of a plurality of artificial intelligence models as a task execution model for the query, ingesting input data based on the context into the at least one determined task execution model, and sequentially or concurrently operating the at least one task execution model into which the input data has been ingested to generate a response to the query.

14 Claims, 11 Drawing Sheets

(51) Int. Cl.

| | |
|---|---|
| ***G06F 16/3329*** | (2025.01) |
| ***G06N 20/00*** | (2019.01) |
| ***G06N 20/20*** | (2019.01) |
| ***G10L 15/16*** | (2006.01) |
| ***G10L 15/18*** | (2013.01) |
| *G10L 15/183* | (2013.01) |

(52) U.S. Cl.

CPC .............. *G06N 20/20* (2019.01); *G10L 15/16* (2013.01); *G10L 15/1815* (2013.01); *G10L 15/22* (2013.01); *G10L 15/18* (2013.01); *G10L 15/1822* (2013.01); *G10L 15/183* (2013.01)

(56) References Cited

U.S. PATENT DOCUMENTS

| | | | | |
|---|---|---|---|---|
| 12,058,321 | B2 | 8/2024 | Auyeung et al. | |
| 12,430,370 | B2 * | 9/2025 | Madisetti | G06F 16/3329 |
| 12,530,536 | B2 * | 1/2026 | Chow | G06F 40/35 |
| 2020/0021873 | A1 | 1/2020 | Swaminathan et al. | |
| 2020/0125955 | A1 | 4/2020 | Klinger et al. | |
| 2020/0334527 | A1 * | 10/2020 | Das | G10L 15/32 |
| 2021/0249018 | A1 * | 8/2021 | Shin | G10L 15/26 |
| 2021/0325861 | A1 * | 10/2021 | Hou | G06N 20/00 |
| 2022/0059200 | A1 | 2/2022 | Rahbar et al. | |
| 2023/0074406 | A1 * | 3/2023 | Baeuml | G06F 16/90332 |
| 2023/0359829 | A1 * | 11/2023 | Yuan | G06N 3/042 |
| 2023/0385494 | A1 | 11/2023 | Park et al. | |
| 2024/0062080 | A1 * | 2/2024 | Mandapaka | G06N 5/022 |
| 2024/0273339 | A1 * | 8/2024 | Zhao | G06N 3/045 |
| 2024/0304185 | A1 * | 9/2024 | Hu | G10L 15/16 |
| 2025/0148296 | A1 * | 5/2025 | Djuhera | G06N 3/098 |
| 2025/0181327 | A1 * | 6/2025 | Sohn | G06F 40/279 |
| 2025/0209098 | A1 * | 6/2025 | Madisetti | G06F 16/3329 |
| 2025/0259042 | A1 * | 8/2025 | Crabtree | G06N 3/047 |
| 2025/0266037 | A1 * | 8/2025 | Pieri | G10L 15/22 |
| 2025/0292084 | A1 * | 9/2025 | Kim | G06N 3/045 |
| 2025/0321992 | A1 * | 10/2025 | Madisetti | G06F 16/3329 |
| 2025/0355907 | A1 * | 11/2025 | Madisetti | G06F 16/3329 |
| 2025/0356847 | A1 * | 11/2025 | Zhang | G10L 15/16 |

OTHER PUBLICATIONS

Zhao et al., "SpeechMoE2: Mixture of Experts Model with Improved Routing", ICASSP 2022, pp. 7217-7221. (Year: 2022).*

Written Opinion of PCT/KR2025/006676 dated Aug. 14, 2025. (Year: 2025).*

International Search Report dated Aug. 14, 2025, issued in PCT International Patent Application No. PCT/KR2025/006676.

Written Opinion dated Aug. 14, 2025, issued in International Patent Application No. PCT/KR2025/006676.

* cited by examiner

METHOD AND SYSTEM FOR PROVIDING ARTIFICIAL INTELLIGENCE MODEL INCLUDING PLURALITY OF MODELS

CROSS REFERENCE TO RELATED APPLICATION

This application is a Bypass Continuation of International Patent Application No. PCT/KR2025/006676, filed on May 16, 2025, which claims priority from and the benefit of Korean Patent Application No. 10-2024-0064550, filed on May 17, 2024, which is hereby incorporated by reference for all purposes as if fully set forth herein.

BACKGROUND

Field

Embodiments of the invention relate generally to a method for providing an artificial intelligence model including a plurality of models and a system therefor, and, more particularly, the present disclosure relates to a method for providing a MoE (Mixture of Experts) model based on a plurality of independently trained specialized models and a system therefor.

Discussion of the Background

In general, artificial intelligence (AI) is implemented through multiple AI models and deep learning based on them. Such AI is being developed to provide various services by considering the user's context (e.g., circumstances, environment, and/or intent). However, when processing specific tasks based on large-volume data, there are limitations arising from the considerable computational costs and time required for this. As a result, the use of AI models in on-device environments, which has been gaining attention recently, is facing certain constraints.

To address this issue, conventional approaches have employed model architectures such as MoE (Mixture of Experts). MoE refers to a machine learning model architecture that solves complex problems by combining multiple expert models. Such a MoE may include expert models, a number of small networks designed to learn different parts and/or different features of given data and perform corresponding data processing operations, and a gating network, which evaluates the performance of each expert model and decides which expert model is most suitable for being allocated a specific task based on given data from the evaluation.

According to the MoE architecture, upon receiving given input data, the gating network determines probabilistic or deterministic task allocation for each expert model. The selected expert models then perform their respective tasks and return the results, thereby enabling data processing for a specific task. By leveraging such MoE architectures, AI models can enhance overall efficiency and performance by selectively activating specific component models when handling complex tasks or large datasets and concentrating computational resources in ways tailored to each particular AI job.

However, conventional MoE architectures require a high level of video random access memory (VRAM) and present considerable challenges in the fine-tuning process. Moreover, conventional MoE approaches are intended to manage large-sized models efficiently, but they have limitations in supporting the efficiency of the remaining resources that are not activated for the given task. Also, in conventional approaches within this technical field, services are typically provided using one-size-fits-all AI models, which presents problems in quickly and easily achieving AI analysis performance that is best suited to a given context.

The above information disclosed in this Background section is only for understanding of the background of the inventive concepts, and, therefore, it may contain information that does not constitute prior art.

SUMMARY

Embodiments of the present disclosure have been devised to address the aforementioned problems, and aim to implement a method for providing a MoE (Mixture of Experts) model based on a plurality of independently trained specialized models and a system therefor.

However, technical objects to be achieved by the present disclosure and the embodiments of the present disclosure are not limited to the aforementioned technical objects, and other technical objects may be present.

Additional features of the inventive concepts will be set forth in the description which follows, and in part will be apparent from the description, or may be learned by practice of the inventive concepts.

An embodiment of the present disclosure may provide a method in which a computing system including a memory and a processor may provide an artificial intelligence model including a plurality of models, the method comprising obtaining a plurality of specialized models which are independently pre-trained artificial intelligence models, obtaining a router (gating network) which is an artificial intelligence module that controls a model task, combining the obtained router and the plurality of specialized models, constructing a MoELM (Mixture of Experts Learning Machine) which is a MoE (Mixture of Experts) architecture-based model as a result of the combining and providing output data for given input data based on the constructed MoELM.

The router may perform task allocation on each of the plurality of specialized models based on the input data.

The combining of the router and the plurality of specialized models may comprise detecting an input data type for each of the plurality of specialized models; and performing different types of combination processes depending on whether the detected input data types are identical.

The performing of combination processes may comprise, if the input data types of the plurality of specialized models are identical, combining the router and the plurality of specialized models by using the obtained router as it is.

The combining of the router and the plurality of specialized models by using the obtained router as it is may comprise integrating the router's weight values for the respective specialized models through a predetermined computation.

The performing of combination processes may comprise, if the input data types of the plurality of specialized models differ from each other, additionally training the obtained router to combine the router and the plurality of specialized models.

The additional training of the obtained router to combine the router and the plurality of specialized models may comprise expanding the input data types of the plurality of specialized models.

The performing of additional training to expand the input data types of the plurality of specialized models may comprise integrating the input data for the plurality of specialized models through a predetermined computation, while preserving the original forms of the input data for the plurality of specialized models and performing additional training to configure the input data type of the integrated input data as the input data type for each of the plurality of specialized models.

The additional training of the obtained router to combine the router and the plurality of specialized models may comprise performing additional training to change the input data types of the plurality of specialized models.

The performing of additional training to change the input data types of the plurality of specialized models may comprise converting the input data of a first specialized model into a weight value to change the same into the input data type of a second specialized model and performing additional training to train and run the second specialized model based on the changed data value.

The combining of the router and the plurality of specialized models may comprise additionally training the obtained router to learn a predetermined existing MoE architecture and automatically set a new MoE based on the learned existing MoE architecture and combining the router and the plurality of specialized models based on the additionally trained router.

Another embodiment of the present disclosure provides a system for providing an artificial intelligence model including a plurality of models, the system comprising at least one memory and at least one processor that retrieves at least one application stored in the memory and provides an artificial intelligence model including a plurality of models, wherein instructions of the processor include instructions for performing the steps of obtaining a plurality of specialized models which are independently pre-trained artificial intelligence models, obtaining a router (gating network) which is an artificial intelligence module that controls a model task, combining the obtained router and the plurality of specialized models, constructing a MoELM which is a MoE (Mixture of Experts) architecture-based model as a result of the combining and providing output data for given input data based on the constructed MoELM.

A method for providing an artificial intelligence model including a plurality of models and a system therefor according to an embodiment of the present disclosure have the effect of implementing a MoE mechanism that achieves highly efficient data processing without unnecessary wasting of resources by utilizing small-sized models, each optimized for a given task, by generating and providing output data from task processing based on given input data using a combined model constructed in the form of a MoE by aggregating independently trained standalone models. This is distinct from conventional MoE methods, which operate while maintaining large sized models overall.

In another embodiment, a computer-implemented method for generating a response to a query may comprise receiving a query by at least one processor of a computer and storing the received query in at least one memory of the computer, identifying, by the at least one processor, a user's context based on the query stored in the at least one memory, and receiving, by the at least one processor, the identified context through at least one artificial intelligence model and generating a response to the query, wherein the generating of a response may comprise controlling at least one router to determine at least one of a plurality of artificial intelligence models as a task execution model for the query, ingesting input data based on the context into the at least one determined task execution model, sequentially or concurrently operating the at least one task execution model into which the input data has been ingested, storing, in the at least one memory, at least one output data based on the at least one operated task execution model, and combining the at least one output data stored in the at least one memory to generate a response to the query.

The at least one router may perform task allocation on each of the plurality of artificial intelligence models based on the input data.

The generating of a response may further comprise detecting an input data type for each of the plurality of artificial intelligence models, and performing different types of combination processes based on the plurality of artificial intelligence models depending on whether the detected input data types are identical.

The performing of combination processes may comprise, if the input data types of the plurality of artificial intelligence models are identical, combining the at least one router and the plurality of artificial intelligence models by using the obtained router as it is.

The combining of the plurality of artificial intelligence models by using the at least one router as it is may comprise integrating the at least one router's weight values for the respective artificial intelligence models through a predetermined computation.

The performing of combination processes may comprise, if the input data types of the plurality of artificial intelligence models differ from each other, additionally training the at least one router to combine the plurality of artificial intelligence models.

The additional training of the at least one router to combine the plurality of artificial intelligence models may comprise performing additional training to expand the input data types of the plurality of artificial intelligence models.

The performing of additional training to expand the input data types of the plurality of artificial intelligence models may comprise integrating the input data for the plurality of artificial intelligence models through a predetermined computation, while preserving the original forms of the input data for the plurality of artificial intelligence models, and performing additional training to configure the input data type of the integrated input data as the input data type for each of the plurality of artificial intelligence models.

The additional training of the at least one router to combine the plurality of artificial intelligence models may comprise performing additional training to change the input data types of the plurality of artificial intelligence models.

The performing of additional training to change the input data types of the plurality of artificial intelligence models may comprise converting the input data of one of the plurality of artificial intelligence models into a weight value to change the same into the input data type of another of the plurality of artificial intelligence models, and performing additional training to train and run the another artificial intelligence model based on the changed data value.

The generating of a response may comprise additionally training the at least one router to learn a predetermined existing MoE architecture and automatically set a new MoE based on the learned existing MoE architecture, and combining the plurality of artificial intelligence models based on the additionally trained at least one router.

The computer-implemented method for generating a response to a query may further comprise storing, by the at least one processor, the generated response in the at least one memory, ingesting, by the at least one processor, the output data stored in the at least one memory into at least one subsequent processing component, wherein the subsequent processing component may include at least one of an on-device model and an external model accessed via a network, and controlling, by the at least one processor, the at least one subsequent processing component to manifest the response through at least one user interface.

The ingesting may comprise controlling the at least one router to ingest the response into at least one of the on-device model and the external model accessed via a network, by considering the task's system load or available resources based on the input data.

In the computer-implemented method for generating a response to a query, in response to a query that requires compound reasoning, the at least one router may decompose the query into a plurality of sub-tasks, and may activate one of the plurality of artificial intelligence models based on the characteristics of each of the decomposed sub-tasks.

The manifesting of the response through at least one user interface may comprise transmitting the output of an artificial intelligence model that has performed one of the plurality of sub-tasks, among the plurality of artificial intelligence models, as input into an artificial intelligence model that performs the next sub-task among the plurality of artificial intelligence models, and aggregating the output data from the artificial intelligence models that have performed the plurality of sub-tasks to generate final output data.

The plurality of artificial intelligence models of the computer-implemented method for generating a response to a query may include at least one of at least one search model that retrieves information from external data sources, or at least one augmentation model that enhances the generation of the response.

In another embodiment, a computer system for generating a response to a query may comprise at least one memory in a computer and at least one processor in the computer, wherein the processor retrieves at least one application stored in the at least one memory and provides at least one artificial intelligence model including a plurality of artificial intelligence models, wherein instructions of the at least one processor include instructions for performing the steps of receiving a query and storing the received query in at least one memory, identifying a user's context based on the query stored in the at least one memory, and receiving the identified context through the at least one artificial intelligence model and generating a response to the query, wherein the instructions of the at least one processor may further include instructions for performing the steps of controlling at least one router to determine at least one of the plurality of artificial intelligence models as a task execution model for the query, ingesting input data based on the context into the at least one determined task execution model, sequentially or concurrently operating the at least one task execution model into which the input data has been ingested, storing, in the at least one memory, at least one output data based on the at least one operated task execution model, and combining the at least one output data stored in the at least one memory to generate a response to the query.

Embodiments of the presently disclosed method for providing an artificial intelligence model including a plurality of models and a system therefor have the effect of supporting various services using an improved form of the MoE model that preserves the advantages of conventional MoE approaches (e.g., faster pre-training speed compared to feedforward neural network (FFN), faster inference speed compared to models of the same size, and/or enhanced instruction tuning performance), while minimizing their disadvantages (e.g., high level of need for video random access memory (VRAM) and/or various challenges during fine-tuning). As a result, the performance and quality of these services, including the generation of a response to a query, can be directly improved.

The effects of the present disclosure are not limited to the foregoing, and other effects not mentioned herein will be able to be clearly understood by those skilled in the art from the following description.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the inventive concepts.

DETAILED DESCRIPTION

Figure 1:
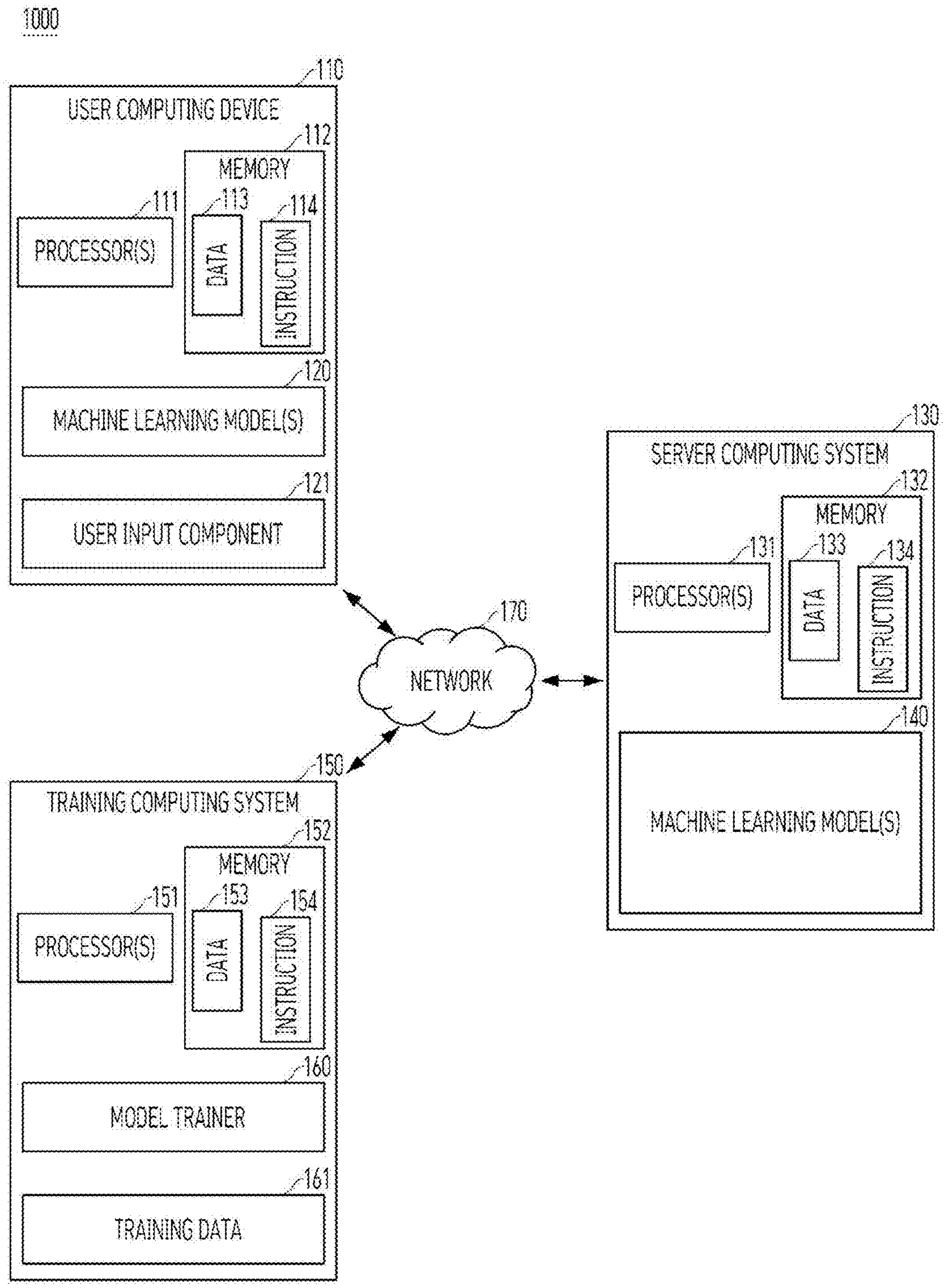
FIG. 1 illustrates an example block diagram of a computing system for implementing a MoE architecture-based AI model according to one embodiment of the present disclosure.

The ongoing need in the art for better efficiency in artificial intelligence methods and systems, particularly in on-device artificial intelligence systems that operate independent of a cloud or external network, is addressed in the present disclosure.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods employing one or more of the inventive concepts disclosed herein. It is apparent, however, that various embodiments may be practiced without these specific details or with one or more equivalent arrangements. In other instances, well-known structures and devices are shown in block diagram form in order to avoid unnecessarily obscuring various embodiments. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of idealized embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As is customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some embodiments may be physically separated into two or more interacting and discrete blocks, units, and/or modules without departing from the scope of the inventive concepts. Further, the blocks, units, and/or modules of some embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Terms such as "include", "comprise", or "have" indicate the presence of features or components described in the specification, but do not preclude the possibility of addition of one or more other features or components. In the drawings, the sizes of components may be exaggerated or reduced for convenience of explanation. For example, the sizes and thicknesses of the components shown in the drawings are arbitrarily shown for convenience of explanation, and thus the present disclosure is not necessarily limited to those shown in the drawing.

Hereinafter, embodiments of the present disclosure will be described in detail with reference to the accompanying drawings. When described with reference to the drawings, identical or corresponding components will be given the same reference numerals, and redundant description of these components will be omitted.

Exemplary System for Implementing MoE Architecture-Based Model

Hereinafter, an exemplary system for implementing a MoE (Mixture of Experts) architecture-based model that provides a MoE model based on a plurality of independently trained specialized models will be described in detail with reference to the accompanying drawings.

FIG. 1 illustrates an example block diagram of a computing system for implementing a MoE architecture-based model according to one embodiment of the present disclosure.

Referring to FIG. 1, a computing system 1000 for implementing a MoE architecture-based-model according to the present disclosure includes a user computing device 110, a server computing system 130, and a training computing system 150, and the devices are capable of communicating via a network 170.

A MoE (Mixture of Experts) architecture-based model based on a plurality of independently trained models according to an embodiment of the present disclosure 1) may be implemented and provided locally by the user computing device 110, 2) may be implemented and provided in the form of a web service by the server computing system 130 communicating with the user computing device 110, or 3) may be implemented and provided through interoperation between the user computing device 110 and the server computing system 130.

In this case, in the embodiment, the user computing device 110 and/or the server computing system 130 may train a machine learning model 120 and/or 140 through interaction with the training computing system 150 connected communicatively via the network 170. The training computing system 150 may be separate from the server computing system 130 or may be a part of the server computing system 130.

Also, in this case, an artificial intelligence model 1) may be directly trained locally by the user computing device 110, 2) may be trained through interaction between the server computing system 130 and the user computing device 110 via the network 170, or 3) may be trained by a separate training computing system 150 using various training and learning techniques. In addition, the artificial intelligence model trained by the training computing system 150 may be implemented in such a manner as to be provided/updated by being transmitted via the network 170 to the user computing device 110 and/or the server computing system 130.

In some embodiments, the training computer system 150 may be a part of the server computing system 130 or a part of the user computing device 110.

The user computing device 110 may include all types of computing devices, such as smart phone, mobile phone, digital broadcasting device, personal digital assistant (PDA), portable multimedia player (PMP), desktop computer, wearable device, embedded computing device, and/or tablet PC.

Such a user computing device 110 includes at least one processor 111 and memory 112. Here, the processor 111 may include at least one of a central processing unit (CPU), graphics processing unit (GPU), application-specific integrated circuits (ASICs), digital signal processors (DSPs), digital signal processing devices (DSPDs), programmable logic devices (PLDs), field-programmable gate arrays (FPGAs), controllers, micro-controllers, microprocessors, and/or other electrical units for performing functions or a plurality of electrically connected processors.

The memory 112 may include one or more non-transitory/transitory computer-readable storage media such as random access memory (RAM), read only memory (ROM), electrically eraseable programmable read only memory (EEPROM), eraseable programmable read only memory (EPROM), flash memory devices, and magnetic disks, and combinations thereof, and may include web storage of a server that performs a storage function of the memory on the internet. Such memory 112 may store data 113 and instructions 114 required for the at least one processor 111 to perform a functional operation such as training an artificial intelligence model or implementing a MoE architecture-based model provision service through the artificial intelligence model.

In one embodiment, the user computing device 110 may store at least one or more machine learning models 120.

In detail, the machine learning models 120 may be various machine learning models such as a plurality of neural networks (e.g., deep neural networks) or other types of machine learning models including nonlinear and/or linear models, and may be configured as a combination thereof.

In this case, the neural networks may include at least one of feed-forward neural networks, recurrent neural networks (e.g., long short-term memory recurrent neural networks), convolutional neural networks, or/and other types of neural networks.

In one embodiment, the user computing device 110 may receive at least one machine learning model 120 from the server computing system 130 via the network 170, store it in the memory 112, and execute the stored machine learning model 120 by the processor 111 to perform a MoE architecture-based model task or the like.

In another embodiment, the server computing system 130 may include at least one machine learning model 140 and perform operations using the machine learning model 140, and may provide the user with a MoE architecture-based model task by operating in conjunction with the user computing device 110 in a manner that communicates related data to the user computing device 110

For example, the user computing device 110 may perform a MoE architecture-based model task via the web in such a way that the server computing system 130 provides output in response to the user's input by using the machine learning model 140.

Additionally, an artificial intelligence model may be implemented in such a way that at least some of the machine learning models 120 and/or 140 are executed on the user computing device 110, while the remaining models are executed on the server computing system 130.

Furthermore, the user computing device 110 may include at least one input component 121 for detecting user input. For example, the user input component 121 may include a touch sensor (e.g., a touch screen and/or touch pad) that detects the touch of a user input medium (e.g., a finger or stylus), an image sensor that detects motion input from the user, a microphone that detects user voice input, buttons, a mouse, and/or a keyboard. In addition, the user input component 121 may include an interface and an external controller (e.g., mouse and/or keyboard) in case it receives input from the external controller through the interface.

The server computing system 130 includes at least one processor 131 and memory 132. Here, the processor 131 may include at least one of a central processing unit (CPU), graphics processing unit (GPU), application-specific integrated circuits (ASICs), digital signal processors (DSPs), digital signal processing devices (DSPDs), programmable logic devices (PLDs), field-programmable gate arrays (FPGAs), controllers, micro-controllers, microprocessors, and/or other electrical units for performing functions or a plurality of electrically connected processors.

In addition, the memory 132 may include one or more non-transitory/transitory computer-readable storage media such as RAM, ROM, EEPROM, EPROM, flash memory devices, and magnetic disks, and combinations thereof. Such memory 132 may store data 133 and instructions 134 required for the processor 131 to perform a functional operation such as training an artificial intelligence model or implementing a MoE architecture-based model through the artificial intelligence model.

In one embodiment, the server computing system 130 may be implemented to include at least one computing device. For example, the server computing system 130 may be implemented to operate a plurality of computing devices according to a sequential computing architecture, a parallel computing architecture, or a combination thereof. Additionally, the server computing system 130 may include a plurality of computing devices connected via the network 170.

Moreover, the server computing system 130 may store at least one machine learning model 140. For example, the server computing system 130 may include, as the machine learning model 140, a neural network and/or other multilayer nonlinear models. Exemplary neural networks may include feed-forward neural networks, deep neural networks, recurrent neural networks, and convolutional neural networks.

The training computing system 150 includes at least one processor 151 and memory 152. Here, the processor 151 may include at least one of a central processing unit (CPU), graphics processing unit (GPU), application-specific integrated circuits (ASICs), digital signal processors (DSPs), digital signal processing devices (DSPDs), programmable logic devices (PLDs), field-programmable gate arrays (FPGAs), controllers, micro-controllers, microprocessors, and/or other electrical units for performing functions or a plurality of electrically connected processors.

In addition, the memory 152 may include one or more non-transitory/transitory computer-readable storage media such as RAM, ROM, EEPROM, EPROM, flash memory devices, and magnetic disks, and combinations thereof. Such memory 152 may store data 153 and instructions 154 required for the processor 151 to train an artificial intelligence model.

Figure 3:
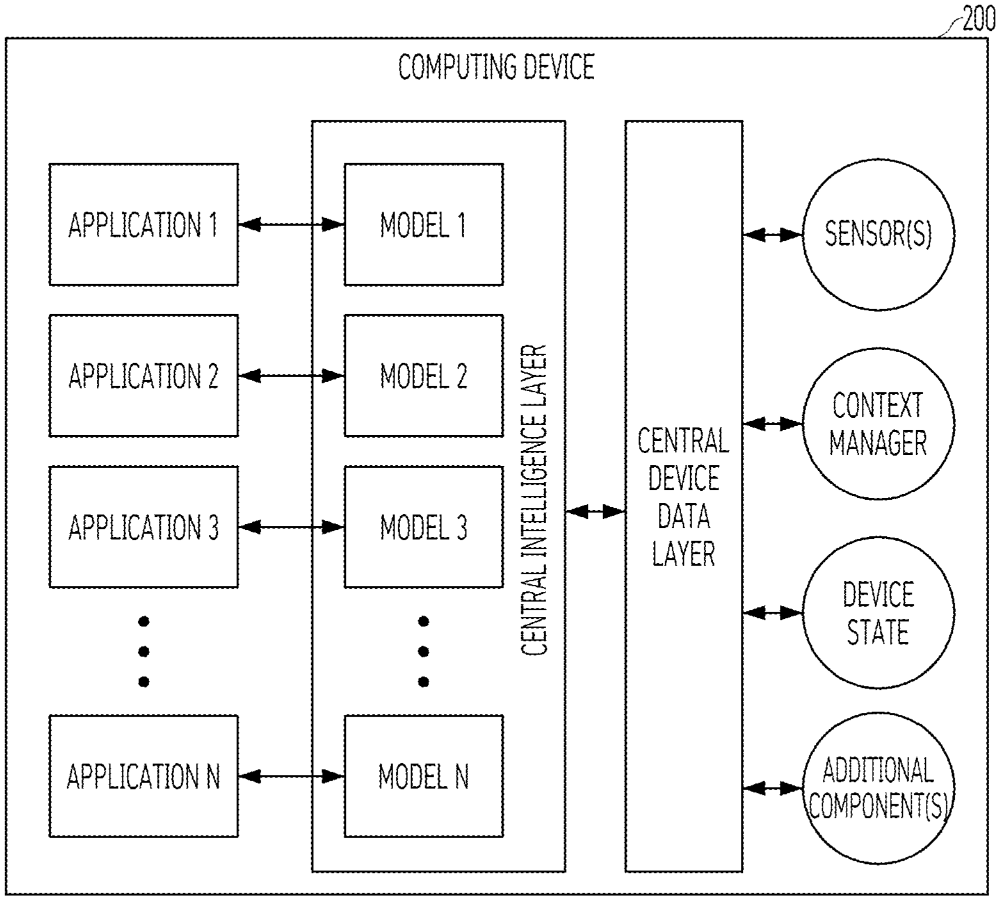
FIG. 3 illustrates an example block diagram of another aspect of a computing device that implements a MoE architecture-based AI model according to one embodiment of the present disclosure.

For example, the training computing system 150 may include a model trainer 160 that trains the machine learning model(s) (120 and/or 140) stored in the user computing device 110 and/or the server computing system 130, by using various training or learning techniques such as error backpropagation (in accordance with the framework illustrated in FIG. 3).

By way of example, such a model trainer 160 may perform updates to one or more parameters of the machine learning model(s) 120 and/or 140 by backpropagation based on a defined loss function.

In some implementation examples, performing error backpropagation may include performing truncated backpropagation through time. The model trainer 160 may perform a number of generalization techniques (e.g., weight decay, dropout, and/or knowledge distillation) to enhance the generalization capability of the machine learning model(s) 120 and/or 140 being trained.

In particular, the model trainer 160 may train the machine learning model(s) 120 and/or 140 based on a series of training data 161. Here, the training data 161 may include different forms of data, such as images, audio samples, and/or text, for example. Examples of image types that can be used include video frames, LiDAR point clouds, X-ray images, computed tomography (CT) scans, hyperspectral images, and/or various other forms of images.

Such training data 161 may be provided by the user computing device 110 and/or the server computing system 130. When the training computing device trains the machine learning model(s) 120 and/or 140 on specific data from the user computing device 110, the machine learning model(s) 120 and/or 140 may be characterized as a personalized model.

Additionally, the model trainer 160 includes computer logic utilized to provide desired functionality.

Moreover, the model trainer 160 may be implemented in hardware, firmware, and/or software that controls a general-purpose processor. In one implementation example, the model trainer 160 may include program files stored on a storage device, be loaded into the memory 152, and be executed by one or more processors 151. In another implementation example, the model trainer 160 may include one or more sets of computer-executable data 153 and instructions 154 stored on a tangible computer-readable storage medium, such as RAM, hard disks, or optical or magnetic media.

The network 170 may include, but is not limited to, 3GPP (3rd Generation Partnership Project) network, LTE (Long Term Evolution) network, WiMAX (World Interoperability for Microwave Access) network, Internet, LAN (Local Area Network), Wireless LAN (Wireless Local Area Network), WAN (Wide Area Network), PAN (Personal Area Network), Bluetooth network, satellite broadcasting network, analog broadcasting network, and/or DMB (Digital Multimedia Broadcasting) network.

In general, communication via the network 170 may be performed using any type of wired and/or wireless connection, through various communication protocols (e.g., TCP/IP, HTTP, SMTP, and/or FTP), encodings or formats (e.g., HTML and/or XML), and/or protection schemas (e.g., VPN, secure HTTP, and/or SSL).

Figure 2:
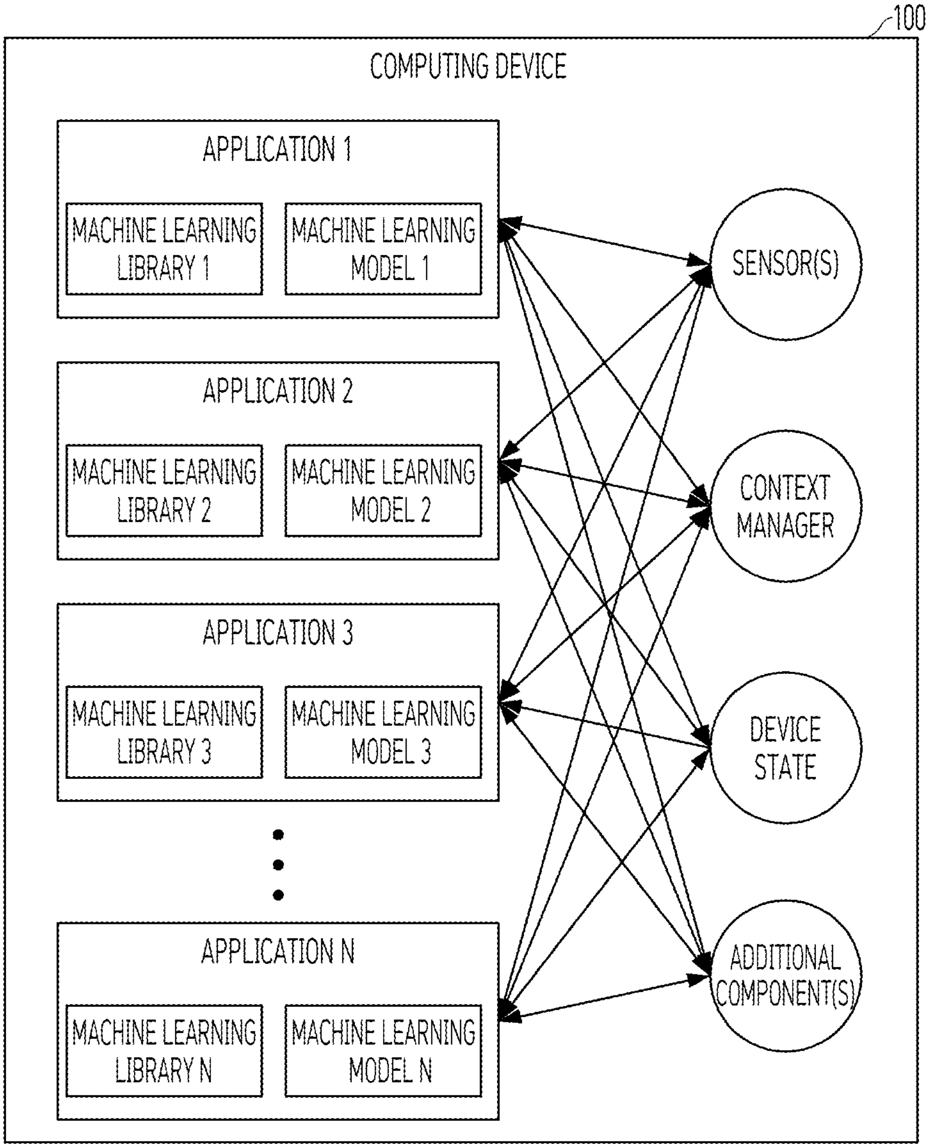
FIG. 2 illustrates an example block diagram of a computing device that implements a MoE architecture-based AI model according to one embodiment of the present disclosure.

FIG. 2 illustrates an example block diagram of a computing device that implements a MoE architecture-based model according to one embodiment of the present disclosure.

Referring to FIG. 2, a computing device 100 included in the user computing device 110, the server computing system 130, and the training computing system 150 may include multiple applications (e.g., Application 1 through Application N). Each application may include a machine learning library and one or more machine learning models. For example, the applications may include image processing (e.g., detection, classification, and/or segmentation) applications, text messaging applications, email applications, dictation applications, virtual keyboard applications, browser applications, and/or chat-bot applications.

In the embodiment, the computing device 100 may include a model trainer 160 for training an artificial intelligence model, and may provide output data based on given input data (e.g., text, speech, image, video, and/or specific sensor-based sensing data) by storing and running the trained artificial intelligence model.

Each application of the computing device 100 may communicate with multiple other components of the computing device 100, such as at least one sensor, a context manager, a device state component, and/or additional components, for example. In one embodiment, each application may use an application programming interface (API, e.g., a public API) to communicate with each device component. In one embodiment, the API used by each application may be specific to that application.

FIG. 3 illustrates an example block diagram of another aspect of a computing device that implements a MoE architecture-based model according to one embodiment of the present disclosure.

Referring to FIG. 3, the computing device 200 includes multiple applications (e.g., Application 1 through Application N). Each application may communicate with a central intelligence layer. For example, the applications may include image processing applications, text messaging applications, email applications, dictation applications, virtual keyboard applications, and/or browser applications. In one embodiment, each application may use an API (e.g., a common API shared across all applications) to communicate with the central intelligence layer (and the models stored therein).

The central intelligence layer may include multiple machine learning models. For example, as illustrated in FIG. 3, at least some of the machine learning models may be provided for each application and managed by the central intelligence layer. In another implementation example, two or more applications may share a single machine learning model. For example, in some implementation examples, the central intelligence layer may provide a single model for all applications. In some implementation examples, the central intelligence layer may be incorporated into the operating system of the computing device 200 or implemented differently.

The central intelligence layer may communicate with a central device data layer. The central device data layer may serve as a centralized data storage location for the computing device 200. As illustrated in FIG. 3, the central device data layer may communicate with multiple other components of the computing device 200, such as one or more sensors, a context manager, a device state component, and/or additional components. In some implementation examples, the central device data layer may use an API (e.g., a private API) to communicate with each device component.

The technology described herein may make reference to servers, databases, software applications, and other computer-based systems, as well as actions taken and information transmitted to or from the above systems. It will be appreciated that the inherent flexibility of computer-based systems allows for a wide range of possible configurations, combinations, divisions of tasks, and functionality between and from components. For example, the processes described herein may be implemented using a single device or component, or multiple devices or components working in combination. Databases and applications may be implemented on a single system or distributed across multiple systems. Distributed components may operate sequentially or in parallel.

Artificial Intelligence Agent Specialization Model (AIAM)

In another aspect, the above computing system 1000 may include an AI agent specialization model AIAM according to an embodiment of the present disclosure.

Here, the AI agent specialization model AIAM according to the embodiment, which is an AI agent model that uses a MoE (Mixture of Experts) architecture implemented according to the embodiment of the present disclosure, may be an artificial intelligence model including a data processing algorithm capable of autonomously acting in specific environments, solving tasks, and achieving goals.

Such an AI agent specialization model AIAM may include a data processing algorithm for implementing a cognitive ability to collect and interpret data from a given environment, a decision mechanism to decide an optimal action based on the collected data, an execution ability to execute the decided action, and a learning ability to improve the action through experience.

As an embodiment, the AI agent specialization model AIAM may obtain given input data (e.g., text, speech, image, video, and/or specific sensor-based sensing data), and based on the obtained input data, perform a given task to provide output data (e.g., response data to a specific query and/or a control signal for a specific instruction).

More specifically, the input data may include a user's query, and the computing system 1000 according to the embodiment may identify the user's context based on the query. Here, the context may include complex information such as the user's previous questions, location, time, and/or preferences. Accordingly, the computing system 1000 may generate a final response to the query by taking the above context into account.

Figure 4:
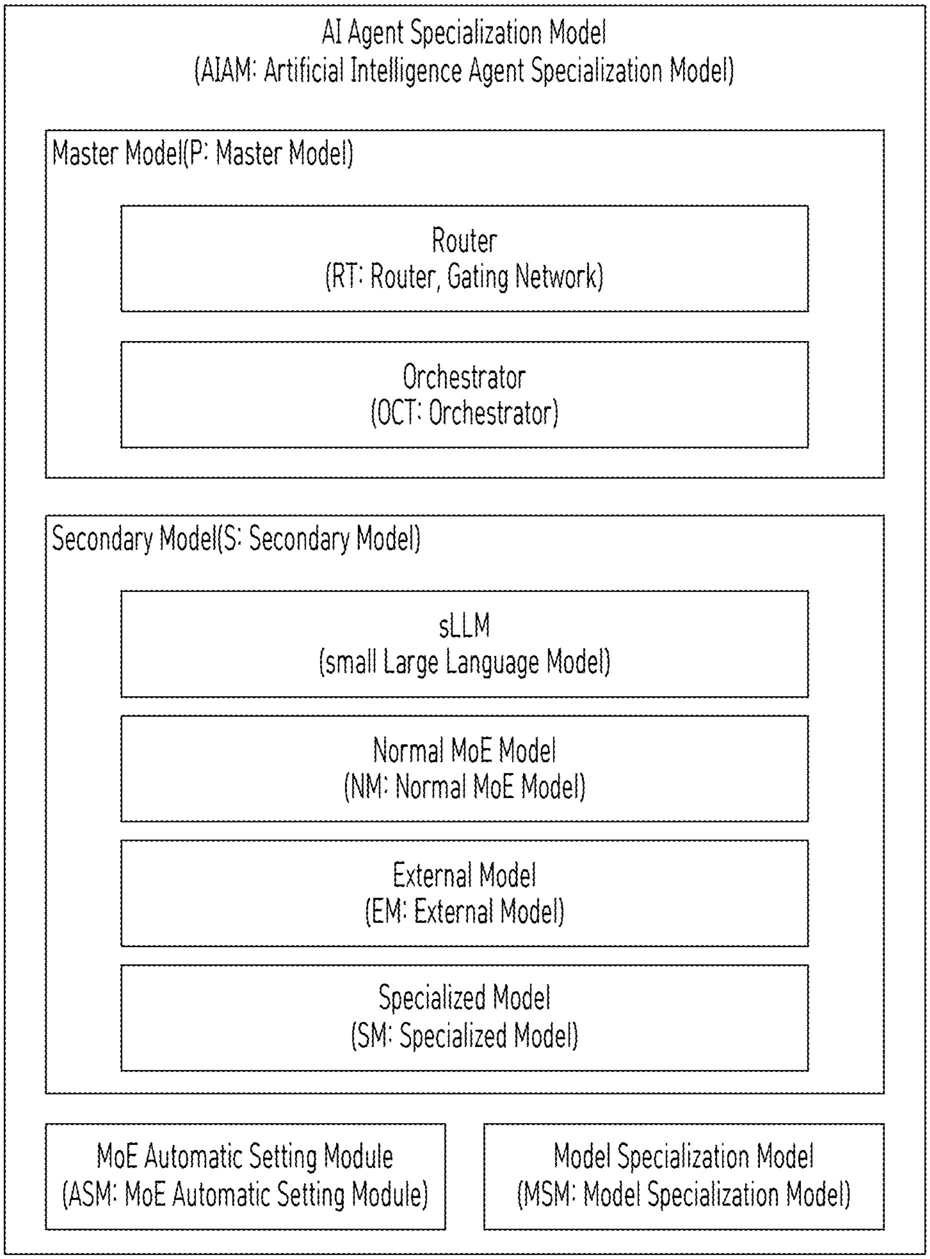
FIG. 4 illustrates an internal block diagram of an AI agent model according to one embodiment of the present disclosure.

FIG. 4 illustrates an internal block diagram of an AI agent model according to one embodiment of the present disclosure.

In detail, referring to FIG. 4, the AI agent model according to the embodiment may include at least one router RT (gating network), an orchestrator OCT, a small large language model sLLM, a normal MoE model NM, an external model EM, and/or a specialized model SM.

In this case, in FIG. 4, the AI agent model is described as including the aforementioned components in order to prevent features of the embodiment of the present disclosure from being obscured.

However, it will be apparent to those skilled in the art that, depending on the embodiment, the AI agent model may further include other general-purpose components in addition to those illustrated in FIG. 4, or some of the components illustrated in FIG. 4 may be omitted.

In more detail, the router RT (gating network) according to an embodiment of the present disclosure may be an artificial intelligence module that performs task allocation and/or traffic control for a plurality of models within the MoE architecture.

Specifically, the router RT may analyze given input data and/or requested tasks to determine which model is most suitable for processing the data.

In one embodiment, the router RT may determine a model optimized for processing given data based on each model's performance, expertise, and/or previous experience.

Moreover, the router RT may support efficient data processing by distributing a given task to at least one model by taking system load into consideration.

Additionally, the router RT may adjust a task allocated to a specific model by flexibly responding to real-time system changes.

In the embodiment, the router RT may be an artificial intelligence module that selectively determines a model (hereinafter, domain-specific model) that executes a data processing operation optimized for a given domain.

That is, in this embodiment, the router RT may be an artificial intelligence module that selects, from among a plurality of models included in the AI agent specialization model AIAM, a model deemed to perform data processing (e.g., deep learning) most suitable for a given domain.

For reference, the term domain as used herein may refer to data, rules, terminology, problem definitions, and/or processes used by a predetermined AI system to perform a specific task.

In the embodiment, the router RT may perform data analysis based on the features of given input data (e.g., user input and/or specific sensing data) and/or a requested task, identify data processing characteristics optimized for that task based on the analysis, and detect a predetermined model for implementing these and determine it as a domain-specific model.

In other words, the router RT according to the embodiment may be an artificial intelligence module that detects a model capable of most effectively performing data processing for a given domain, allocates and distributes the corresponding task processing operation, and manages it.

In this case, the router RT according to the embodiment may include a router RT pre-trained according to a disclosed predetermined algorithm, a router RT additionally trained according to the embodiment of the present disclosure, and/or a router RT newly trained using a new method. A detailed description of this will be given in the section [MoE Model Provision Method] below.

Additionally, the router RT according to the embodiment may further perform additional functional operations as disclosed in the section [MoE Model Construction Method] below.

Meanwhile, the orchestrator OCT according to some embodiments of the present disclosure may be an artificial intelligence module that comprehensively controls and manages the overall configuration of the AI agent specialization model AIAM.

In detail, in some embodiments, the orchestrator OCT may allocate various tasks occurring within the entire system to appropriate resources (e.g., the router RT and/or a predetermined model).

Further, the orchestrator OCT may manage the efficient use of resources, such as available models and hardware resources (e.g., CPU and/or GPU).

The orchestrator OCT may monitor the overall system performance and, when necessary, adjust specific parameters or optimize the network configuration or the like.

The orchestrator OCT may manage the interoperation among a plurality of routers RT and/or models and control data flow and processing.

That is, in some embodiments, the orchestrator OCT may perform control and management of the entire system of the AI agent specialization model AIAM, and may serve as a main router that controls at least one router RT.

In this case, the orchestrator OCT and the at least one router RT according to the embodiment may closely interoperate with each other to support efficient operation of the MoE system.

Specifically, the orchestrator OCT, as the manager of the entire system, may monitor the performance of the at least one router RT and adjust the strategies of the at least one router RT when necessary.

On the other hand, the at least one router RT may practically execute the allocation of data processing tasks based on instructions from the orchestrator OCT and/or its own algorithm, thereby enabling efficient system control.

In some embodiments, the above-described orchestrator OCT and/or router RT may serve as a master model P that controls and manages the overall system and/or the remaining components (i.e., sLLM, normal MoE model NM, external model EM, and/or specialized model SM) of the AI agent model.

The sLLM (small large language model) according to some embodiments of the present disclosure may be an artificial intelligence module that is implemented as a lightweight version of a large language model LLM.

That is, the sLLM may be an artificial intelligence module that is constructed to achieve performance comparable to that of a large-scale model such as LLM by using fewer resources.

In some embodiments, such an sLLM may include a MoE model (MoELM) based on a combination of a plurality of specialized models SM and a router RT according to the embodiment of the present disclosure, as disclosed in the section [MoE Model Construction Method]. Further, the sLLM may include a MoE model (decentralized mixture of experts (DMoE) model) based on a domain-specific specialized model according to the embodiment of the present disclosure, as disclosed in the section [Method for Specifying Model Based on MoE] to be described later. A detailed description of this is given in the sections [MoE Model Construction Method] and [Method for Specifying Model Based on MoE].

Additionally, the normal MoE model NM according to the embodiment of the present disclosure may refer to a predetermined MoE model that is implemented based on a disclosed universal method.

By way of example, the normal MoE model NM may include a switch transformer, conditional computation in neural networks, a sparse mixture of experts, and/or Megatron-LM.

The external model EM according to some embodiments of the present disclosure may refer to a predetermined artificial intelligence model that is implemented according to various disclosed algorithms.

For example, the external model EM may include ChatGPT, Gemini, and/or Llama.

In some embodiments, such an external model EM may be selectively used as necessary to support the processing of a given task.

The specialized model SM according to some embodiments of the present disclosure may refer to an artificial intelligence model that is trained for optimization for a specific purpose.

That is, the specialized model SM may be an artificial intelligence model that is trained using training data and methods specialized to achieve a predetermined objective.

In this case, the specialized model SM described throughout the embodiments of the present disclosure may correspond to a specific example of an artificial intelligence model to which the technical concept of the present disclosure can be applied.

Accordingly, the specialized model SM according to the embodiment of the present disclosure may include various artificial intelligence models with varied structures and purposes.

In some embodiments, such a specialized model SM may include a predetermined trained sLLM (including a MoELM and/or DMoE model), a normal MoE model NM, and/or an external Model EM. Further, the specialized model SM may include a specialized module model according to some embodiments of the present disclosure, as disclosed in the section [Method for Specifying Model Based on MoE] to be described later. A detailed description of this is given in the section [Method for Specifying Model Based on MoE].

In some embodiments, the aforementioned sLLM, normal MoE model NM, external model EM, and/or specialized model SM may be secondary models S capable of performing a specific task under the control and management of the master model P (i.e., orchestrator OCT and/or router RT) of the AI agent model.

MoE Model Construction Method

Hereinafter, a method for building a MoE architecture-based model, in which a computing system 1000 according to an embodiment of the present disclosure provides a MoE (Mixture of Experts) model based on a plurality of independently trained specialized models SM, will be described in detail with reference to the accompanying drawings.

Figure 5:
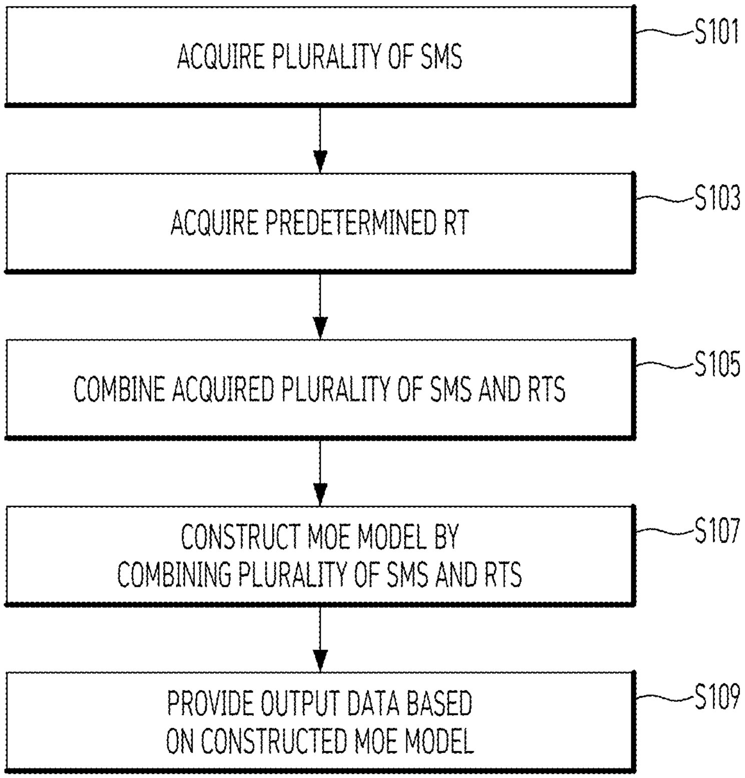
FIG. 5 illustrates a flowchart for explaining construction of a MoE model according to one embodiment of the present disclosure.
Figure 6:
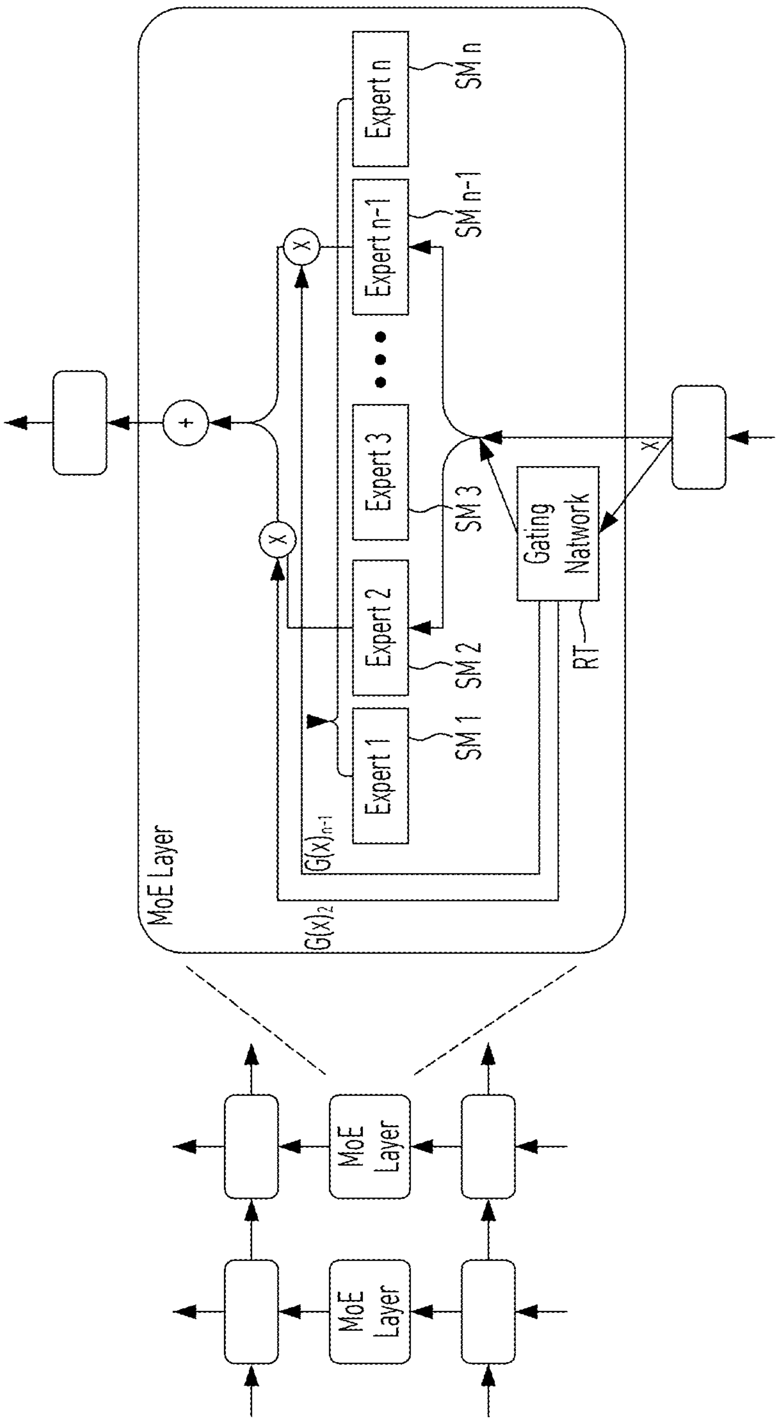
FIG. 6 illustrates a conceptual diagram for explaining a structure of a MoE model according to one embodiment of the present disclosure.

FIG. 5 illustrates a flowchart for explaining a MoE model construction method according to one embodiment of the present disclosure, and FIG. 6 illustrates a conceptual diagram for explaining a MoE model construction method according to one embodiment of the present disclosure.

Referring to FIGS. 5 and 6, a method for constructing and implementing a MoE architecture-based model, in which a computing system 1000 according to an embodiment of the present disclosure provides a MoE model based on a plurality of pre-trained specialized models SM, may include: a step S101 of obtaining a plurality of specialized models SM; a step S103 of obtaining a predetermined router RT; a step S105 of combining the obtained plurality of specialized models SM and the obtained router RT; a step S107 of constructing a MoE model based on the combination of the specialized models SM and the router RT; and a step S109 of providing output data based on the constructed MoE model.

Specifically, the computing system 1000 according to an embodiment of the present disclosure may obtain a plurality of specialized models SM. (S101)

Here, in other words, a specialized model SM according to some embodiments may refer to an artificial intelligence model that is trained for optimization for a specific purpose, meaning an artificial intelligence model that is trained using training data and methods specialized for that purpose.

In some embodiments, such specialized models SM may include a predetermined trained sLLM (including a MoELM and/or DMoE model), a normal MoE model NM, an external model EM, and/or a specialized module model according to the embodiment of the present disclosure disclosed in the section [Method for Specifying Model Based on MoE] described later.

In detail, in some embodiments, the computing system 1000 may obtain the above plurality of specialized models SM via user input and/or interoperation with an external server.

Additionally, the computing system 1000 according to an embodiment of the present disclosure may obtain a predetermined router RT. (S103)

Here, in other words, the router RT according to some embodiments may be an artificial intelligence module that performs task allocation and/or traffic control for a plurality of models within the MoE architecture.

In detail, in some embodiments, the computing system 1000 may obtain at least one router RT via user input and/or interoperation with an external server.

In this case, the router RT may include a router RT pre-trained according to a predetermined disclosed algorithm, a router RT additionally trained according to the embodiment of the present disclosure to be described later, and/or a router RT newly trained using a new method.

Additionally, the computing system 1000 according to an embodiment of the present disclosure may combine the obtained plurality of specialized models SM and the obtained router RT. (S105)

That is, in some embodiments, the computing system 1000 may combine a plurality of independently trained specialized models SM and a router RT.

Specifically, the computing system 1000 may construct a single model (hereinafter, MoELM) that operates together with the MoE architecture of FIG. 6 by adding a router RT to a plurality of specialized models SM.

In other words, the computing system 1000 may configure a third MoE using modularized specialized models SM.

In this case, in embodiments, the computing system 1000 may detect an input data type for each of the plurality of specialized models SM.

Then, the computing system 1000 may perform different types of combination processes depending on whether the detected input data types are identical.

In more detail, in some embodiments, if the input data types of the plurality of specialized models SM are identical, the computing system 1000 may combine the plurality of specialized models SM and the router RT by using the existing router RT.

Specifically, in some embodiments, the computing system 1000 may combine the plurality of specialized models SM and the router RT by integrating the existing router RT's weight values for the respective specialized models SM through a predetermined computation. The computing system 1000 may combine the specialized models SM and the router RT by simply summing the existing router RT's weight values for the respective specialized models SM, by summing them through sampling, and/or by summing them according to a specific formula based on user settings.

Through this, the computing system 1000 may combine a plurality of independently trained specialized models SM and a router RT into one without requiring additional training.

On the other hand, in some embodiments, if the input data types of the specialized models SM differ from each other, the computing system 1000 may additionally train the existing router RT to combine the specialized models SM and the router RT.

Hereinafter, for effective explanation, the plurality of specialized models SM will be described as, but is not limited to, a first specialized model SM and a second specialized model SM.

In detail, in some embodiments, the computing system 1000 may train the router RT to expand the input data types of the first specialized model SM and the second specialized model SM.

More specifically, the computing system 1000 may integrate the input data for the first specialized model SM and the input data for the second specialized model SM through a predetermined computation, while preserving the original forms of the input data.

Furthermore, the computing system 1000 may train the router RT to use the input data type of the integrated input data as the input data type of the first and second specialized models SM.

In other words, the computing system 1000 may additionally train the router RT to expand the input data types of the first specialized model SM and the second specialized model SM and perform training and operation based on this.

In another embodiment, the computing system 1000 may train the router RT to change the input data types of the first specialized model SM and the second specialized model SM.

Specifically, the computing system 1000 may convert the input data of the first specialized model SM into a weight value to change it into the input data type of the second specialized model SM.

Then, the computing system 1000 may train the router RT to train and run the second specialized model SM using the changed data value.

In the same manner, the computing system 1000 may change the input data of the second specialized model SM into the input data type of the first specialized model SM and then train the router RT to train and run the first specialized model SM using the changed input data. That is, the computing system 1000 may additionally train the router RT to change the input data types of the first specialized model SM and the second specialized model SM and perform training and operation accordingly.

As such, in the embodiment, the computing system 1000 may combine the plurality of specialized models SM and the router RT, along with additional training to resolve differences in input data type between the specialized models SM, thereby constructing a combined model (i.e., MoELM) that prevents errors arising from this and performs smoother learning and operation.

In some embodiments, the computing system 1000 may combine the plurality of specialized models SM and the router RT by newly training the existing router RT using a new method.

In detail, in some embodiments, the computing system 1000 may train the router RT to determine which input data should be delivered to which specialized model SM, depending the input data and/or available resources. In this case, the computing system 1000 may also train the router RT to decide whether to deliver the entire input data or only a portion of it.

Furthermore, the computing system 1000 may train the router RT to determine how many specialized models SM to activate, depending on the input data and/or available resources.

Furthermore, in some embodiments, the computing system 1000 may train the router RT to assess the quality of output data and accordingly decide which input data should be delivered to which specialized model SM.

The computing system 1000 may train the router RT to assess data processing speed and/or performance and accordingly decide which input data should be delivered to which specialized model SM.

The computing system 1000 may train the router RT to assess data processing quality according to initial settings and accordingly decide which input data should be delivered to which specialized model SM.

The computing system 1000 may train the router RT to decide which input data should be delivered to which specialized model SM, based on target performance and data processing speed inputted by the user.

The computing system 1000 may train the router RT such that the router RT itself identifies an optimal specialized model SM and delivers input data to that specialized model SM, based on user feedback, reinforcement learning, LLM-based self-feedback, reinforcement learning from human feedback (RLHF), and/or reinforcement learning from AI feedback (RLAIF).

Referring further to FIG. 4, in some embodiments, the computing system 1000 may further include an artificial intelligence module (hereinafter, a MoE automatic setting module ASM) that learns a predetermined existing MoE architecture and automatically sets a new MoE based on it.

The computing system 1000 may also use the aforementioned MoE automatic setting module ASM to configure the training and operation of the router RT.

In this case, once the MoE automatic setting module ASM completes the settings for the router RT, it may cease performing any further operations.

In some embodiments, the computing system 1000 may train the router RT to implement the functional operations of the aforementioned MoE automatic setting module ASM. As such, the computing system 1000 may execute various new router (RT) training processes so that the plurality of specialized models SM and the router RT are seamlessly combined with each other.

Thus, the computing system 1000 can more reliably ensure the performance and quality of the combined model (i.e., MoELM).

In addition, the computing system 1000 according to some embodiments of the present disclosure may construct a MoE model by combining the plurality of specialized models SM and the router RT. (S107)

That is, in the embodiment, the computing system 1000 may construct a single model (i.e., MoELM) that operates together with the MoE architecture by combining the plurality of specialized models SM and the router RT as described above.

In some embodiments, the MoELM may be included in the sLLM.

In addition, the computing system 1000 according to an embodiment of the present disclosure may provide output data based on the constructed MoE model (S109).

That is, in some embodiments, the computing system 1000 may provide output data (e.g., response data to a specific query and/or a control signal for a specific instruction) for given input data (e.g., text, speech, image, video, and/or specific sensor-based sensing data) by using the MoELM constructed as above.

In a specific embodiment, the computing system 1000 may use the DMoE model constructed as described above to process a task that requires compound reasoning, and transmit and provide the resulting output data to a predetermined user computing device 110.

For example, the computing system 1000 may receive a complex user query through an on-device AI agent, such as "Find a restaurant near my current location that is open now and offers vegetarian options, and provide the optimal route to the one with the highest social media rating."

Upon receiving such a query, which requires compound reasoning, the computing system 1000 may decompose the complex query into logical sub-tasks through the router RT included in the DMoE model—for example, (1) a task of identifying the current location, (2) a task of searching for nearby restaurant information, (3) a task of checking each restaurant's menus and business hours, (4) a task of comparing social media ratings, (5) a task of calculating the route to the final destination, and (6) a task of aggregating all of this information to generate an answer.

Subsequently, the computing system 1000 may selectively activate one or more of the plurality of specialized models SM based on the characteristics of each sub-task decomposed through the router RT.

For example, the computing system 1000 may sequentially or concurrently assign and operate a 'location information specialized model' for obtaining location data, a 'web search specialized model' for retrieving restaurant information, a 'map and route navigation specialized model' for calculating routes, and a 'natural language processing sLLM' for generating the final answer.

In this case, the 'location information specialized model', 'web search specialized model', etc. may correspond to a specific embodiment of the specialized models SM described throughout the present detailed description.

As a concrete example, the plurality of specialized models SM may include various models (i.e., search models) that obtain information from external data sources.

Here, the external data source may refer to any information source outside the model, such as the web, specific databases, APIs, and/or local file systems.

For example, a search model may be an artificial intelligence model that accesses external data sources such as the web, specific databases, APIs, and/or local file systems to retrieve necessary information.

As another example, the plurality of specialized models SM may include various models (i.e., augmentation models) that enhance the generation of the final response using the retrieved information.

For example, an augmentation model may be an artificial intelligence model that performs Retrieval-Augmented Generation (RAG), which improves the accuracy and detail of responses based on the latest information or factual data obtained by the search model.

Returning to the discussion, and in the embodiment, the computing system 1000 may use a combined model constructed in the form of a MoE by combining independently trained standalone models, to direct the entire reasoning process, such as by transmitting the output of a specialized model SM that has performed one of a plurality of sub-tasks as input into a specialized model SM that has performed the next sub-task, under the control of the router RT and/or the orchestrator OCT.

Accordingly, the computing system 1000 may aggregate the output data from the specialized models SM that have performed the plurality of sub-tasks to generate final output data (or response), thereby providing the result of the complex task to the user.

In this case, the above-described method is not limited to the aforementioned examples and can be broadly applied to various compound reasoning-based services, such as planning intricate travel itineraries, comparing and recommending products, and conducting multi-criteria searches.

Furthermore, in some embodiments, the computing system 1000 may ingest the final output data (or response) generated as described above into at least one subsequent processing component. Here, the subsequent processing component may refer to a functional unit that receives data generated by at least one processor and performs predetermined subsequent processing. It may be implemented in hardware, software, or a combination thereof.

For example, the subsequent processing component may include a user interface generation component for manifesting the output data (or response) through a user interface, a data storage component for storing the output data (or response) in a specific format in a database, and/or a visualization processing component for visualizing the output data (or response).

In this case, in some embodiments, the subsequent processing component may process and manifest the output data (or response) in the form of a table and/or graph on a graphical user interface (GUI) of the user computing device 110.

As described above, in some embodiments, the computing system 1000 may combine individually trained specialized models SM with a router RT to run them together with the MoE architecture, and may provide corresponding output data.

In other words, the computing system 1000 may generate and provide output data from task processing based on given input data using a combined model (i.e., MoELM) constructed in the form of a MoE by aggregating independently trained standalone models.

Through this, in some embodiments, the computing system 1000 can implement a MoE mechanism that achieves highly efficient data processing without unnecessary wasting of resources by utilizing small-sized models optimized for a given task, unlike conventional MoE methods that operate while maintaining large-sized models overall.

Thus, the computing system 1000 can support various services using an improved form of the MoE model that preserves the advantages of conventional MoE approaches (e.g., faster pre-training speed compared to FFN, faster inference speed compared to models of the same size, and/or enhanced instruction tuning performance), while minimizing their disadvantages (e.g., high level of necessity of VRAM and/or various challenges during fine-tuning). As a result, the performance and quality of these services can be directly improved.

Method for Specifying Model Based on MoE

Hereinafter, a method for constructing and implementing a MoE (Mixture of Experts) architecture-based model, in which a computing system 1000 according to some embodiments of the present disclosure implements modularization of a given specialized model SM within a MoE model, will be described in detail with reference to the accompanying drawings.

Figure 7:
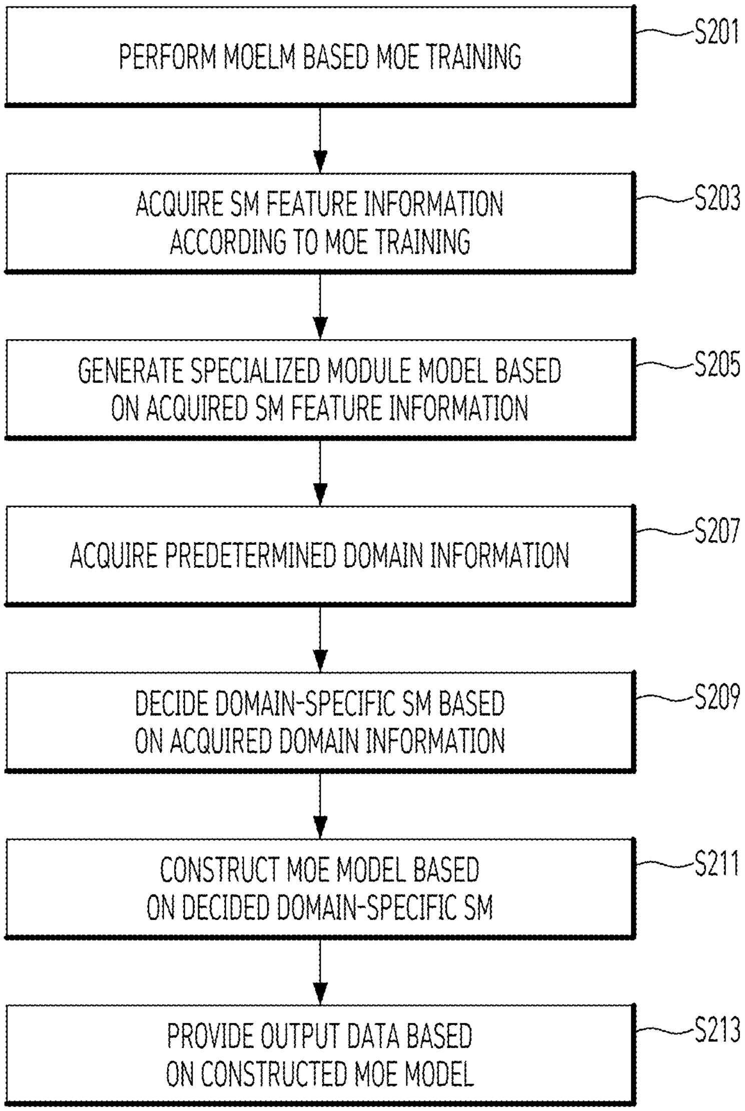
FIG. 7 illustrates a flowchart for explaining a method for specifying a model based on MoE according to one embodiment of the present disclosure.
Figure 8:
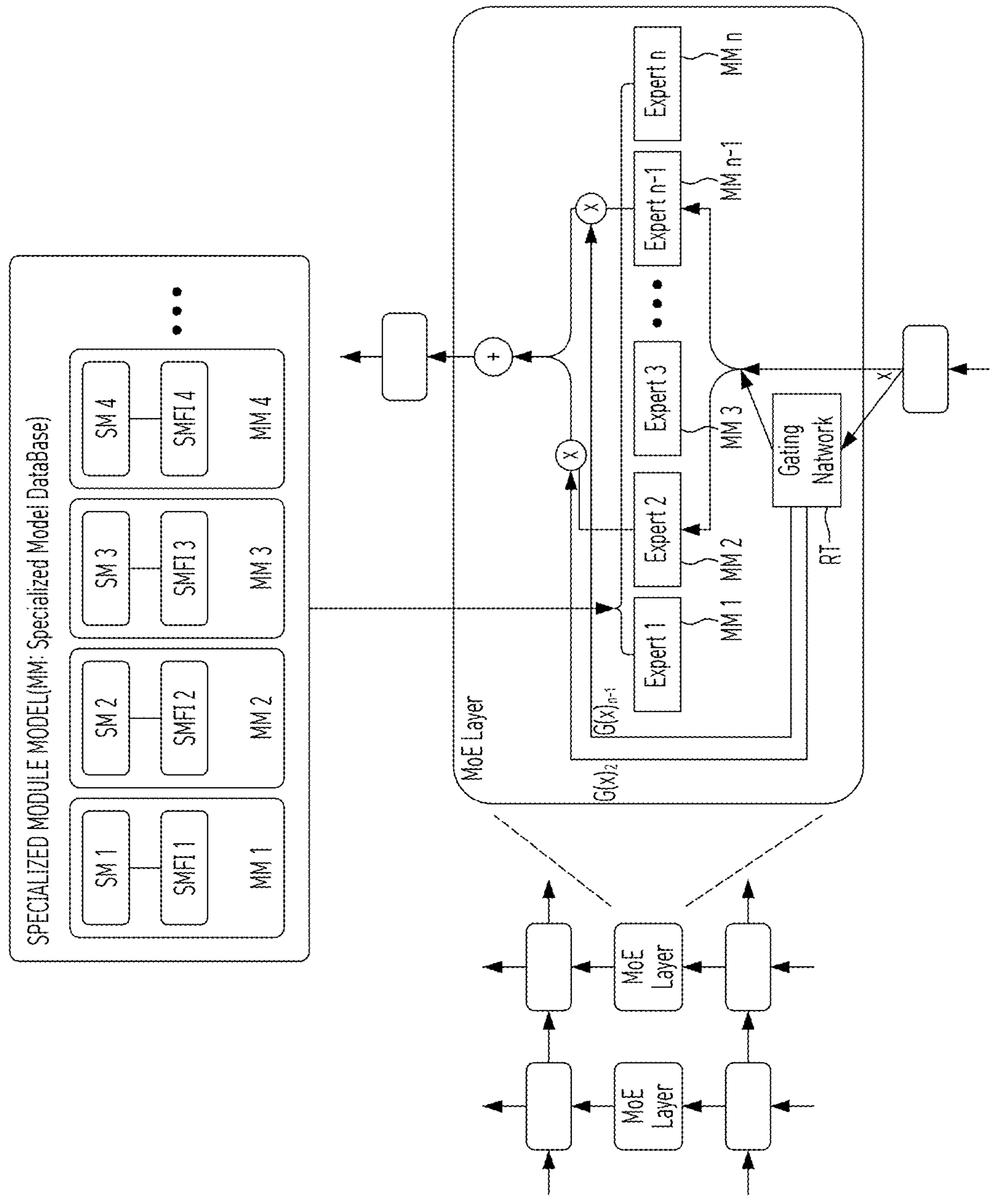
FIG. 8 illustrates a conceptual diagram for explaining a method for specifying a model based on MoE according to one embodiment of the present disclosure.

FIG. 7 illustrates a flowchart for explaining a method for specifying a model based on MoE according to one embodiment of the present disclosure, and FIG. 8 illustrates a conceptual diagram for explaining a method for specifying a model based on MoE according to one embodiment of the present disclosure.

Referring to FIGS. 7 and 8, a method for constructing and implementing a MoE architecture-based model, in which a computing system 1000 according to an embodiment of the present disclosure implements modularization of a specialized model SM included in a MoE model may include a step S201 of performing MoE training based on MoELM; a step S203 of obtaining specialized model (SM) feature information from the MoE training; a step S205 of generating a specialized module model based on the obtained specialized model (SM) feature information; a step S207 of obtaining given domain information; a step S209 of determining a domain-specific specialized model based on the obtained domain information; a step S211 of constructing a MoE model based on the determined domain-specific specialized model; and a step S213 of providing output data based on the constructed MoE model.

Specifically, in many cases, it is difficult to distinguish or identify which domain a general pre-trained specialized model SM is optimized for.
As a result, certain limitations may arise in selecting and utilizing a specialized model SM that is most optimized for a given task.
To address this issue, in some embodiments of the present disclosure, the computing system 1000 may perform the following process in which it specifies a role and/or function of each specialized model SM, modularizes them, and based on this, effectively selects and utilizes a customized specialized model SM optimized for a specific domain.

Specifically, the computing system 1000 according to some embodiments of the present disclosure may perform MoE training based on MoELM. (S201)
That is, the computing system 1000 can perform MoE training based on MoELM constructed according to the above-described [MoE construction method].
In this case, as the training is performed, the computing system 1000 may implement training for each of the plurality of specialized models SM included in the MoELM.
In other words, as the above training is performed, the plurality of specialized models SM within the MoELM may be individually trained.

A specialized model SM according to some embodiments may refer to an artificial intelligence model that is trained for optimization for a specific purpose, meaning an artificial intelligence model that is trained using training data and methods specialized for that specific purpose.
Such specialized models SM may include a predetermined trained sLLM (including a MoELM and/or DMoE model), a normal MoE model NM, an external model EM, and/or a specialized module model MM according to the embodiment of the present disclosure disclosed below.

In addition, the computing system 1000 according to some embodiments of the present disclosure may obtain specialized model feature information (SMFI) from the MoE training (S203).
Here, the specialized model feature information SMFI may refer to information that specifies a role and/or function of a given specialized model SM.

In more detail, referring further to FIG. 4, in some embodiments, the computing system 1000 may further include a model specialization module MSM.
Further, the computing system 1000 may obtain the above-described specialized model feature information SMFI via interoperation with the model specialization module MSM.

Here, the model specialization module MSM according to some embodiments may be an artificial intelligence module that generates and outputs specialized model feature information SMFI corresponding to a given specialized model SM based on MoE training.

Specifically, in some embodiments, the model specialization module MSM may monitor and track how a task for each specialized model SM is allocated by the router RT when the above-described MoE training is performed.
That is, the model specialization module MSM may identify which task the router RT distributes and allocates to which specialized model SM as the MoELM is trained and run.
In some embodiments, the model specialization module MSM may generate a tag for specifying each allocated task being tracked and manage how the tag is matched.
Through this, the model specialization module MSM may assess the expertise of each of the plurality of specialized models SM.

Additionally, in some embodiments, the model specialization module MSM may generate specialized model feature information SMFI corresponding to each specialized model SM, based on the assessed expertise of each specialized model SM.

Figure 9:
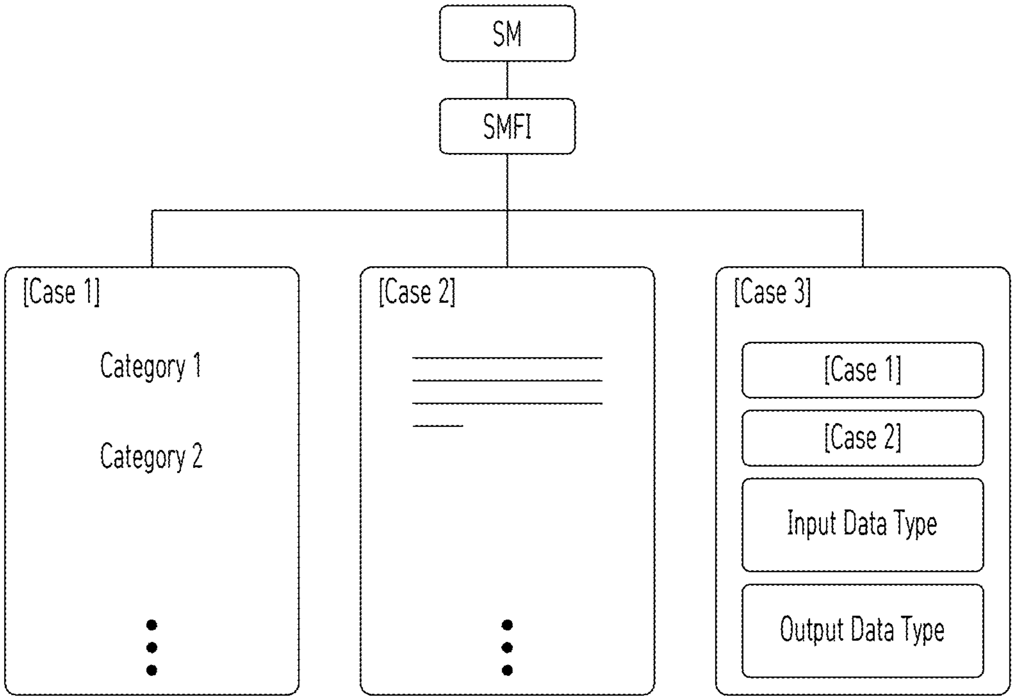
FIG. 9 illustrates an example of specialized model feature information according to one embodiment of the present disclosure.

FIG. 9 illustrates an example of specialized model feature information SMFI according to one embodiment of the present disclosure.

In this case, referring to FIG. 9, in the embodiment, the model specialization module MSM may generate the above-described specialized model feature information SMFI in at least one of the following cases:

[Case 1] Specialized model feature information SMFI that selects one category among role-and/or function-specific categories (e.g., query answering or device control) of a preset specialized model SM based on user input.

[Case 2] Specialized model feature information SMFI that specifies a role and/or function of a specialized model SM in natural language.

[Case 3] Specialized model feature information SMFI that specifies a role and/or function of a specialized model SM using at least one of Case 1 and Case 2 and further defines input data and output data of the specialized model SM.

Subsequently, in some embodiments, the model specialization module MSM may provide the above generated specialized model feature information SMFI to the computing system 1000 as output data.
Accordingly, the computing system 1000 may obtain feature information for each specialized model SM through interoperation with the model specialization module MSM.

Furthermore, in the embodiment of the present disclosure, the computing system 1000 may generate a specialized module model MM based on the obtained specialized model feature information SMFI (S205).

Here, the specialized module model MM according to some embodiments may refer to a specialized model SM that is matched with given specialized model feature information SMFI, and that is independent and discrete.

In detail, in some embodiments, the computing system 1000 may match the specialized model feature information SMFI obtained as described above with the corresponding specialized model SM.
Additionally, the computing system 1000 may organize each specialized model SM matched with the specialized model feature information SMFI independently and discretely in a database.

That is, the computing system 1000 may perform modularization by matching each specialized model SM with the corresponding SMFI and storing and managing them separately and discretely.

Accordingly, the computing system 1000 may generate a specialized module model MM, which is a specialized model SM that is matched with the specialized model feature information SMFI, and that is independent and discrete.

As such, the computing system 1000 can identify a feature of each specialized model SM within a given MoE model (MoELM in the embodiment) and modularize each specialized model SM into a compact size that allows for reuse and sharing by reflecting the feature.

Therefore, the computing system 1000 can more accurately, quickly, and efficiently sort and select specialized models SM that implement data processing optimized for a specific domain and, based on this, facilitate flexible expansion or reduction of the MoE model.

Furthermore, the computing system 1000 according to some embodiments may obtain given domain information (S207).

The term domain information as used herein may refer to information that defines a domain that specifies data, rules, terminology, problem definitions, and/or processes used by a given AI system to perform a given task.

Specifically, the computing system 1000 may obtain given input data (e.g., text, speech, images, video, and/or specific sensor-based sensing data).

Additionally, in some embodiments, the computing system 1000 may identify a domain corresponding to the obtained input data.

In this case, a method for the computing system 1000 to identify a domain for input data may be performed based on various disclosed algorithms capable of performing this method, and the embodiment of the present disclosure does not limit or restrict the algorithms.

Accordingly, the computing system 1000 may obtain domain information for the task to be processed.

Furthermore, the computing system 1000 according to some embodiments may determine a domain-specific specialized model based on the obtained domain information (S209).

Here, the domain-specific specialized model according to the embodiment may refer to a specialized model SM that performs a data processing operation (e.g., deep learning) optimized for a given domain.

In detail, referring further to FIG. 8, in some embodiments, the computing system 1000 may determine at least one domain-specific specialized model based on the domain information and specialized model feature information SMFI obtained as described above. In more detail, the computing system 1000 may detect at least one piece of specialized model feature information SMFI that has a feature corresponding to the obtained domain information. For example, if the computing system 1000 identifies "a feature of a task of outputting response data for given query data" based on first domain information, it may detect at least one piece of specialized model feature information SMFI from a database of a plurality of specialized models' feature information SMFI, specified as having "a role and/or function specialized in answering queries".

In this case, in some embodiments, the computing system 1000 may detect at least one piece of specialized model feature information SMFI corresponding to the domain information, based on a plurality of tags generated by the model specialization module MSM for each task the router RT allocates to the plurality of specialized models SM, during the above-described MoE architecture-based training.

That is, in some embodiments, the computing system 1000 may detect at least one piece of specialized model feature information SMFI corresponding to the domain information by comparing the domain information with the plurality of tags generated as described above.

In some embodiments, the computing system 1000 may filter the tags to be compared based on the time at which each tag is generated.

Specifically, the computing system 1000 may designate at least one tag generated at a specific task's allocation time as the tag(s) to be compared, according to user input and/or a preset internal process.

For example, the computing system 1000 may designate, as the tag(s) to be compared, at least one tag generated for a task allocated after a preset time during the training period, based on the observation that the task allocation accuracy improves as the learning rate increases.

Accordingly, the computing system 1000 may detect at least one piece of specialized model feature information SMFI corresponding to the domain information by comparing the domain information with at least one filtered tag that ensures higher accuracy.

Moreover, the computing system 1000 may extract a specialized model SM (i.e., a specialized module model MM) matched with each of the at least one specialized model's detected feature information SMFI.

In addition, in some embodiments, the computing system 1000 may determine the at least one extracted specialized module model MM as a domain-specific specialized model (s). Furthermore, the computing system 1000 may construct a MoE model based on the determined domain-specific specialized model(s). (S211)

Referring further to FIG. 8, in some embodiments, the computing system 1000 may construct a single model (hereinafter, DMoE model) that operates together with the MoE architecture based on the at least one domain-specific specialized model determined as described above.

In other words, the computing system 1000 may construct a MoE model (i.e., DMoE model) that implements data processing optimized for a specific domain by using at least some (i.e., domain-specific specialized model(s)) of a plurality of specialized models SM modularized in a small size.

In detail, in some embodiments, the computing system 1000 may construct the above-described DMoE model by combining at least one domain-specific specialized model with a predetermined router RT.

In this case, a concrete method in which the computing system 1000 constructs the DMoE model by combining a domain-specific specialized model and a router RT may be based on the description of the method for constructing MoELM by combining a plurality of expert models SM and a router RT, as disclosed in the above-described [MoE Model Constructing Method].

Accordingly, in some embodiments, the computing system 1000 may construct a DMoE model including a domain-specific specialized models and a router RT.

In this case, the DMoE model may be included in an sLLM according to the embodiment of the present disclosure.

In other words, the sLLM may include a DMoE model constructed according to an embodiment of the present disclosure.

Furthermore, the computing system 1000 according to some embodiments may provide output data based on the constructed MoE model (S213).

That is, the computing system 1000 may provide output data (e.g., response data to a specific query and/or a control signal for a specific instruction) for given input data (e.g., text, speech, image, video, and/or specific sensor-based sensing data) by using the DMoE model constructed as described above.

As described above, in some embodiments, the computing system 1000 can specify a role and/or function of each specialized model SM, separate and modularize them individually into a reusable and shareable size, and rapidly and flexibly construct a customized MoE model (i.e., DMoE model) optimized for a specific domain using such a modularized specialized model and provide given output data through efficient task processing using the constructed model.

In other words, the computing system 1000 can implement and provide a MoE model with enhanced data processing (and/or computational) speed and improved inference performance and support a variety of services accordingly, thereby effectively promoting improvements in performance and quality.

Method for Providing AI Agent Based on MoE-Applied LLM

Hereinafter, a method for constructing and implementing a MoE architecture-based model, in which a computing system 1000 according to an embodiment of the present disclosure determines an application model optimized for a domain according to an external environment based on a MoE (Mixture of Experts)-applied LLM (Large Language Model) and provides an on-device-specific AI (Artificial Intelligence) agent that generates output based on the determined application model, will be described in detail with reference to the accompanying drawings.

Figure 10:
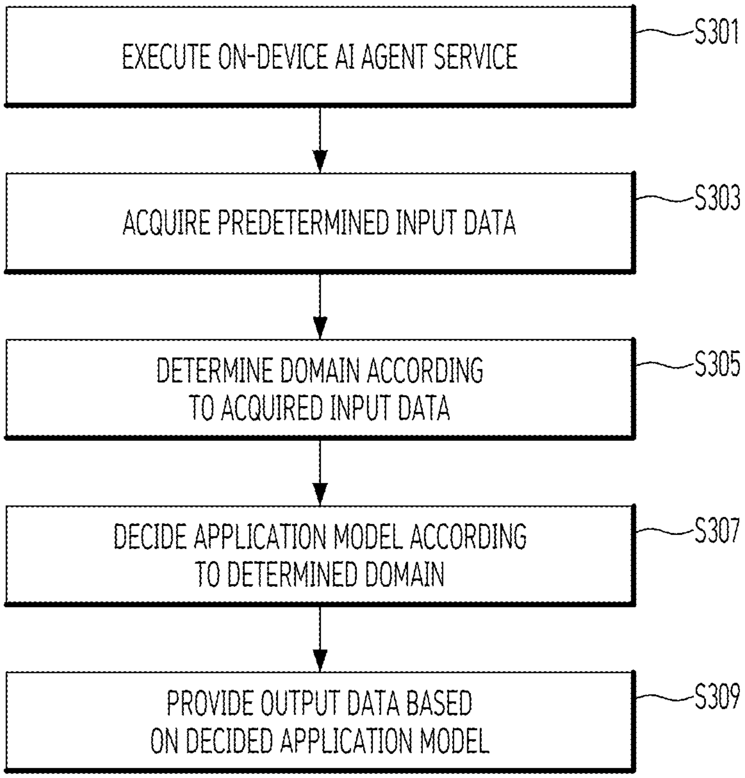
FIG. 10 illustrates a flowchart for explaining a method for providing an AI agent based on a MoE-applied large language model (LLM) according to one embodiment of the present disclosure.
Figure 11:
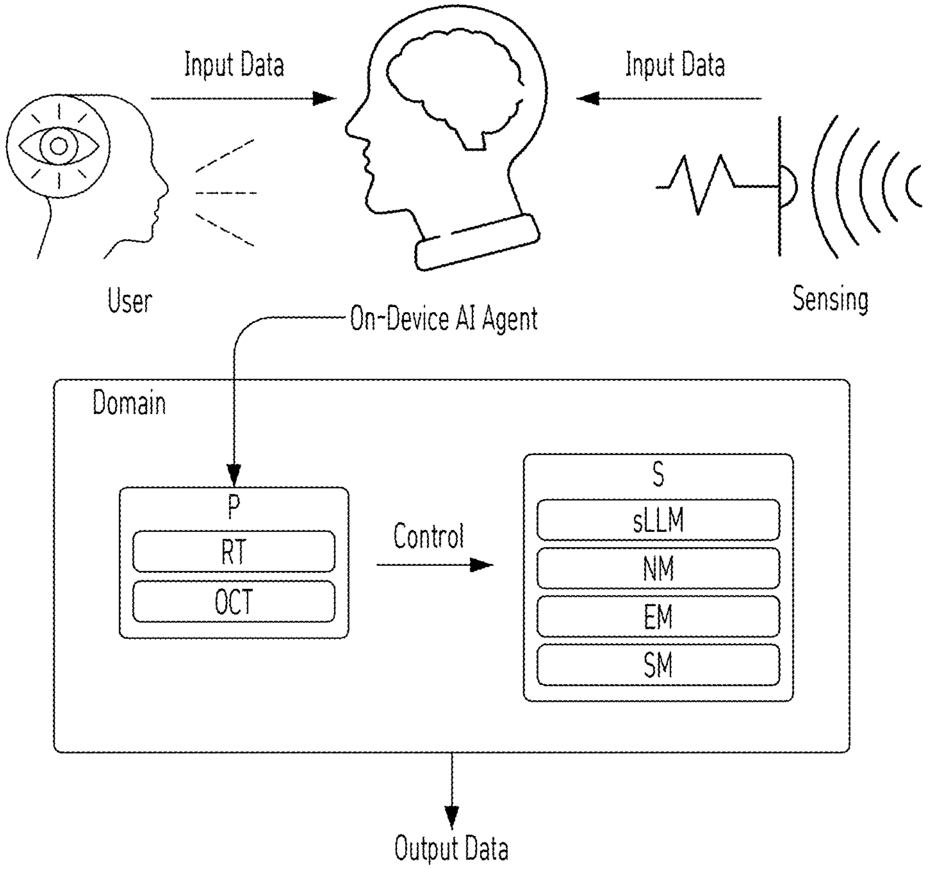
FIG. 11 shows a conceptual diagram for explaining a method for providing an AI agent based on a MoE-applied LLM according to one embodiment of the present disclosure.

FIG. 10 illustrates a flowchart for explaining a method for providing an AI agent based on a MoE-applied LLM according to one embodiment of the present disclosure, and FIG. 11 shows a conceptual diagram for explaining a method for providing an AI agent based on a MoE-applied LLM according to one embodiment of the present disclosure.

Referring to FIGS. 10 and 11, a method for constructing and implementing a MoE architecture-based model, in which a computing system 1000 according to an embodiment of the present disclosure determines an application model optimized for a domain according to an external environment based on a MoE (Mixture of Experts)-applied LLM (Large Language Model) and provides an on-device-specific AI (Artificial Intelligence Agent) agent that generates output based on the determined application model, may include: a step S301 of executing an on-device AI agent service; a step S303 of obtaining given input data; a step S305 of identifying a domain for the obtained input data; a step S307 of determining an application model for the identified domain; and a step S309 of providing output data based on the determined application model.

Specifically, the computing system 1000 according to an embodiment of the present disclosure may execute an on-device AI agent service (S301).

Here, for reference, the on-device AI may refer to a technology that performs artificial intelligence-based data processing directly within the user's device, rather than relying on cloud or external servers. Since all processing is completed within the device without transmitting data externally, this approach offers advantages such as personal information protection, real-time processing, and reduced dependency on internet connectivity.

Accordingly, in relation to this, the term on-device AI agent service may refer to various services implemented using on-device AI.

For example, on-device AI agent services may include smartphone voice assistant services (e.g., Google Assistant, Apple Siri, Samsung Bixby, etc.), smart camera services (e.g., Google Pixel's HDR+, Apple's Deep Fusion, etc.), fitness tracker and smartwatch services (e.g., Apple Watch, Fitbit, etc.), autonomous driving systems (e.g., Tesla's Autopilot, etc.), and/or home security services (e.g., Nest Secure, Ring, etc.).

In some embodiments, the computing system 1000 may execute a predetermined on-device AI agent service via interoperation with an AI Agent Specialization Model AIAM according to the embodiment of the present disclosure and/or a given application.

Furthermore, the computing system 1000 according to some embodiments of the present disclosure may obtain given input data (S303).

In detail, in some embodiments, the computing system 1000 may obtain at least one input data (e.g., given text, speech, image, video, and/or sensing data) via user input based on the on-device AI agent service executed as above and/or via interoperation with an external device (e.g., a given sensor).

The input data obtained as above may include given data that can specify a target task for data processing.

Furthermore, the computing system 1000 may identify a domain for the obtained input data (S305).

The term domain as used herein may refer to data, rules, terminology, problem definitions, and/or processes used by a given AI system to perform a given task.

In detail, in some embodiments, the computing system 1000 may identify a domain corresponding to the obtained input data.

In this case, a method for the computing system 1000 to identify a domain for input data may be performed based on various disclosed algorithms capable of performing the method, and the embodiment of the present disclosure does not limit or restrict the algorithms.

Accordingly, the computing system 1000 may obtain domain information for the task to be processed.

Furthermore, the computing system 1000 according to some embodiments of the present disclosure may determine an application model for the identified domain. (S307).

The term application model as used herein may refer to a model that performs a given task based on given input data. Such an application model may be at least one of the secondary models S described above.

In this case, in other words, the term secondary model S may refer to a model capable of performing a specific task under the control and management of a master model P (i.e., orchestrator OCT and/or router RT) which is responsible for the control and management of a predetermined AI system operation.

In the embodiment, such a secondary model S may include at least one of sLLM (including a MoELM and/or DMoE model), a normal MoE model NM, an external Model EM, and/or a specialized model SM (including a specialized module model MM).

In detail, in some embodiments, the computing system 1000 may determine at least one application model based on the domain information obtained as described above.

More specifically, the computing system 1000 may detect at least one model (i.e., domain-specific model) that executes a data processing (e.g., deep learning) operation optimized for given domain information, among the aforementioned secondary models S, by interoperating with a master model P (i.e., orchestrator OCT and/or router RT).

In this case, in embodiments of the present disclosure, a concrete method in which the computing system 1000 detects a domain-specific model by interoperating with a master model P will be omitted as the description of the router RT and orchestrator OCT disclosed in the above-described [AI Agent Specialization Model (AIAM)] shall apply.

Moreover, the computing system 1000 may determine the at least one detected domain-specific model as an application model.

The computing system 1000 may provide output data based on the determined application model (S309).

That is, in some embodiments, the computing system 1000 may generate and provide output data (e.g., response data to a specific query and/or a control signal for a specific instruction) for given input data (e.g., text, speech, image, video, and/or specific sensor-based sensing data) based on at least one application model determined through the AI agent specialization model AIAM as described above.

In other words, the computing system 1000 may perform a predetermined requested task based on given input data by using the application model determined as above, and may provide output data from the performed data processing.

In this case, the computing system 1000 may provide the output data based on the above-described on-device AI agent service.

As described above, in some embodiments, the computing system 1000 may effectively determine a model optimized for data processing for a given domain even in an on-device environment, based on an AI agent specialization model AIAM including models (e.g., MoEL, DMoE model, and/or specialized module model MM) implemented by using MoE architecture, and may provide output from effective data processing through the determined model.

That is, the computing system 1000 may implement and provide an artificial intelligence model (i.e., AI agent specialization model AIAM)) capable of better understanding, interpreting, executing, and responding to a given task in any environment.

Accordingly, in embodiments, the computing system 1000 may significantly and directly enhance the quality and performance of various AI agent-based services (e.g., smartphone voice assistant services, smart camera services, fitness tracker and smartwatch services, autonomous driving services, and/or home security services).

The embodiments of the present disclosure described above may be implemented in the form of program instructions that can be executed through various computer components and recorded on a computer-readable medium. The computer readable medium may include program instructions, data files, data structures, and the like alone or in combination. The program instructions recorded on the computer-readable recording medium may be specially designed and configured for the present disclosure, or may be known and available to those skilled in computer software. Examples of the computer-readable recording medium include: magnetic media such as hard disks, floppy disks, and magnetic tape; optical media such as CD-ROMs and DVDs; magneto-optical media such as floptical disks; and hardware devices such as ROM, RAM, and flash memory specifically configured to store and execute program instructions. Examples of the program instructions include machine language codes such as those generated by a compiler, as well as high-level language codes that can be executed by a computer using an interpreter or the like. The hardware devices may be configured to act as one or more software modules in order to perform processing according to the present disclosure, and vice versa.

The specific implementations described in the present disclosure are exemplary embodiments, and do not limit the scope of the present disclosure in any way. For brevity of the specification, descriptions of conventional electronic configurations, control systems, software, and other functional aspects of the systems may be omitted. In addition, the connections or connection members of lines between the components shown in the drawings are illustrative examples of functional connections and/or physical or circuit connections, and in actual devices, may be shown as alternative or additional various functional connections, physical connections, or circuit connections. In addition, unless specifically mentioned, such as "essential", "importantly", etc., the components described herein may not be necessary components for application of the present disclosure.

Although certain embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A computer-implemented method for generating a response to a query requiring compound reasoning, comprising:

receiving a query by at least one processor of a computer and storing the received query in at least one memory of a computer;

identifying, by the at least one processor, a user's context based on the query stored in the at least one memory; and receiving, by the at least one processor, the identified context through at least one artificial intelligence model and generating a response to the query, wherein the generating of a response comprises:

controlling at least one router to determine at least one of a plurality of artificial intelligence models as a task execution model for the query;

detecting an input data type for each of the plurality of artificial intelligence models;

ingesting input data based on the context into the at least one determined task execution model;

sequentially or concurrently operating the at least one task execution model into which the input data has been ingested;

storing, in the at least one memory, at least one output data based on the at least one operated task execution model; and combining the at least one output data stored in the at least one memory to generate a response to the query, and performing different types of combination processes based on the plurality of artificial intelligence models depending on whether the detected input data types are identical, wherein the at least one router performs task allocation on each of the plurality of artificial intelligence models based on the input data, and wherein the performing of combination processes comprises, if the input data types of the plurality of artificial intelligence models differ from each other, additionally training the at least one router to combine the plurality of artificial intelligence models.

2. The method of claim 1, wherein the performing of combination processes comprises, if the input data types of the plurality of artificial intelligence models are identical, combining the at least one router and the plurality of artificial intelligence models by using the obtained router as it is.

3. The method of claim 2, wherein the combining of the plurality of artificial intelligence models by using the at least one router as it is comprises integrating the at least one router's weight values for the respective artificial intelligence models through a predetermined computation.

4. The method of claim 1, wherein the additional training of the at least one router to combine the plurality of artificial intelligence models comprises performing additional training to expand the input data types of the plurality of artificial intelligence models.

5. The method of claim 4, wherein the performing of additional training to expand the input data types of the plurality of artificial intelligence models comprises:
- integrating the input data for the plurality of artificial intelligence models through a predetermined computation, while preserving the original forms of the input data for the plurality of artificial intelligence models; and
- performing additional training to configure the input data type of the integrated input data as the input data type for each of the plurality of artificial intelligence models.

6. The method of claim 1, wherein the additional training of the at least one router to combine the plurality of artificial intelligence models comprises performing additional training to change the input data types of the plurality of artificial intelligence models.

7. The method of claim 6, wherein the performing of additional training to change the input data types of the plurality of artificial intelligence models comprises:
- converting the input data of one of the plurality of artificial intelligence models into a weight value to change the same into the input data type of another of the plurality of artificial intelligence models; and
- performing additional training to train and run the another artificial intelligence model based on the changed data value.

8. The method of claim 1, wherein the generating of a response comprises:
- additionally training the at least one router to learn a predetermined existing MoE architecture and automatically set a new MoE based on the learned existing MoE architecture; and
- combining the plurality of artificial intelligence models based on the additionally trained at least one router.

9. The method of claim 1, further comprising:
- storing, by the at least one processor, the generated response in the at least one memory;
- ingesting, by the at least one processor, the output data stored in the at least one memory into at least one subsequent processing component, wherein the subsequent processing component includes at least one of an on-device model and an external model accessed via a network; and
- controlling, by the at least one processor, the at least one subsequent processing component to manifest the response through at least one user interface.

10. The method of claim 9, wherein the ingesting comprises controlling the at least one router to ingest the response into at least one of the on-device model and the external model accessed via a network, by considering the task's system load or available resources based on the input data.

11. The method of claim 9, wherein, in response to a query that requires compound reasoning, the at least one router decomposes the query into a plurality of sub-tasks, and activates one of the plurality of artificial intelligence models based on the characteristics of each of the decomposed sub-tasks.

12. The method of claim 11, wherein the manifesting of the response through at least one user interface comprises:
- transmitting the output of an artificial intelligence model that has performed one of the plurality of sub-tasks, among the plurality of artificial intelligence models, as input into an artificial intelligence model that performs the next sub-task among the plurality of artificial intelligence models; and
- aggregating the output data from the artificial intelligence models that have performed the plurality of sub-tasks to generate final output data.

13. The method of claim 1, wherein the plurality of artificial intelligence models includes at least one of: at least one search model that retrieves information from external data sources; or at least one augmentation model that enhances the generation of the response.

14. A computer system for generating a response to a query requiring compound reasoning, comprising:
- at least one memory in a computer; and
- at least one processor in the computer, wherein the processor retrieves at least one application stored in the at least one memory and provides at least one artificial intelligence model including a plurality of artificial intelligence models,
- wherein instructions of the at least one processor include instructions for performing the steps of:
- receiving a query and storing the received query in at least one memory;
- identifying a user's context based on the query stored in the at least one memory; and
- receiving the identified context through the at least one artificial intelligence model and generating a response to the query,
- wherein the instructions of the at least one processor further include instructions for performing the steps of:
- detecting an input data type for each of the plurality of artificial intelligence models;
- controlling at least one router to determine at least one of the plurality of artificial intelligence models as a task execution model for the query and to perform task allocation on each of the plurality of artificial intelligence models based on the input data;
- ingesting input data based on the context into the at least one determined task execution model;
- sequentially or concurrently operating the at least one task execution model into which the input data has been ingested;
- storing, in the at least one memory, at least one output data based on the at least one operated task execution model;
- combining the at least one output data stored in the at least one memory to generate a response to the query and, if the input data types of the plurality of artificial intelligence models differ from each other, additionally training the at least one router to combine the plurality of artificial intelligence models; and performing different types of combination processes based on the plurality of artificial intelligence models depending on whether the detected input data types are identical.

* * * * *